CARRIER CURRENT TELEPHONE SYSTEMS

Filed March 27, 1952

9 Sheets-Sheet 1

INVENTOR.
Pier Bakker
BY
Smith, Olsen & Baird
Attys.

June 19, 1956 P. BAKKER 2,751,436

CARRIER CURRENT TELEPHONE SYSTEMS

Filed March 27, 1952 9 Sheets-Sheet 2

INVENTOR.
Pier Bakker

BY
Smith, Olsen + Baird
Attys

INVENTOR.
Pier Bakker
BY
Smith, Olsen & Baird
Attys.

INVENTOR.
Pier Bakker
BY
Smith, Olsen + Baird
Attys.

June 19, 1956 P. BAKKER 2,751,436

CARRIER CURRENT TELEPHONE SYSTEMS

Filed March 27, 1952 9 Sheets-Sheet 5

INVENTOR.
Pier Bakker
BY
Smith, Olsen + Baird
Attys.

INVENTOR.
Pier Bakker
BY
Smith, Olsen & Baird
Attys.

June 19, 1956 P. BAKKER 2,751,436

CARRIER CURRENT TELEPHONE SYSTEMS

Filed March 27, 1952 9 Sheets-Sheet 7

INVENTOR.
Pier Bakker

BY

Smith, Olsen + Baird

Atty

INVENTOR.
Pier Bakker
BY
Smith, Olsen & Baird
Atty.

June 19, 1956 P. BAKKER 2,751,436

CARRIER CURRENT TELEPHONE SYSTEMS

Filed March 27, 1952 9 Sheets-Sheet 9

INVENTOR.
Pier Bakker
BY
Smith, Olsen & Baird
Attys.

United States Patent Office 2,751,436
Patented June 19, 1956

2,751,436

CARRIER CURRENT TELEPHONE SYSTEMS

Pier Bakker, Chicago, Ill., assignor to Automatic Electric Laboratories, Inc., Chicago, Ill., a corporation of Delaware Application March 27, 1952, Serial No. 278,899

17 Claims. (Cl. 179—27)

Figure 1:
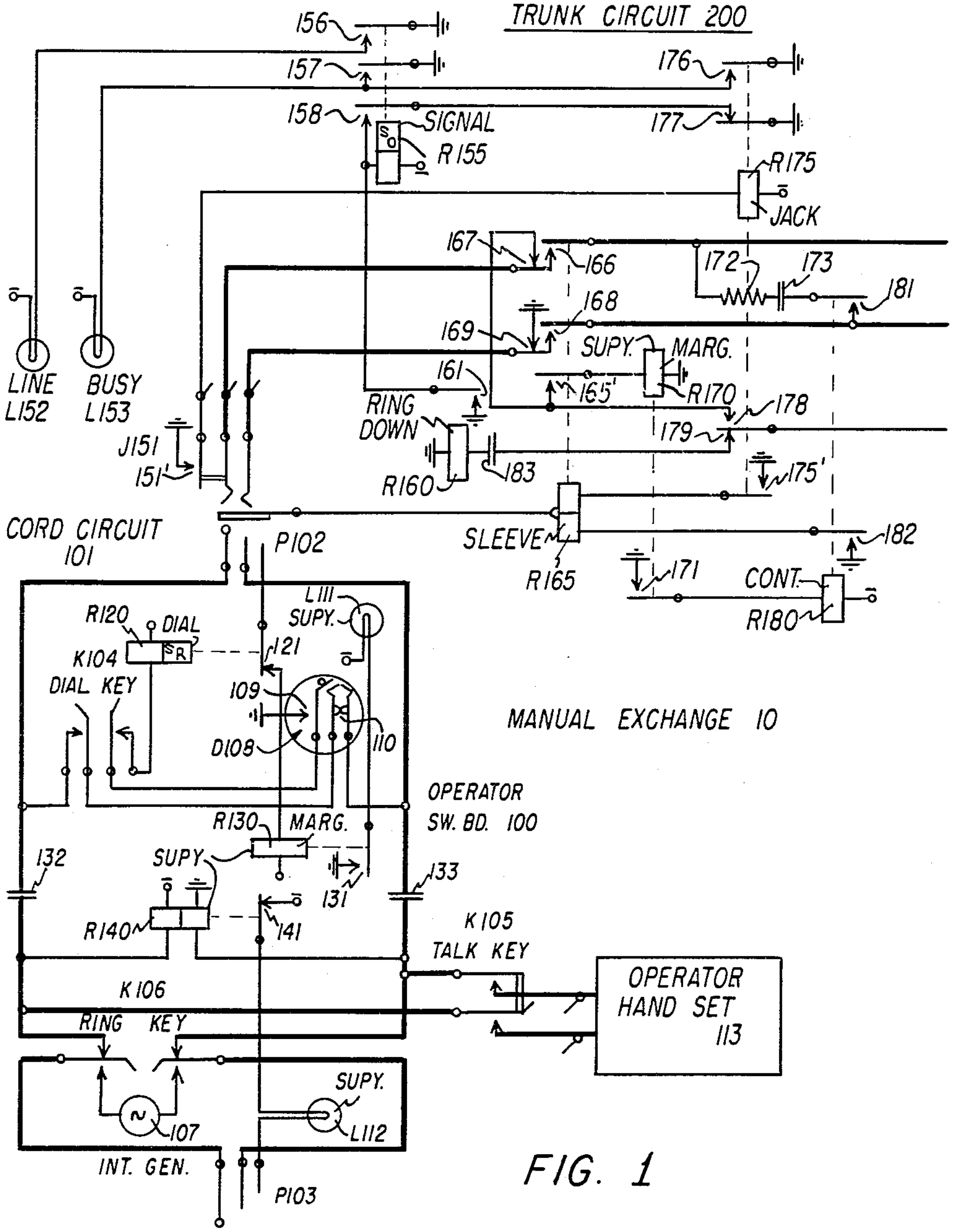

The present invention relates to carrier current telephone systems, and more particularly to such a system involving a first exchange provided with an operator switchboard and a second exchange provided with automatic switching apparatus and subscriber substations.

A telephone system of the type noted frequently comprises a physical line extending between the first and second exchanges and a plurality of two-way carrier current channels stacked upon the line. Each of the channels includes a first terminal in the first exchange operatively associated with the operator switchboard and a second terminal in the second exchange operatively associated with the switching apparatus. In each channel, the calling operator switchboard employs in the first terminal a first carrier frequency for supervisory purposes and a given side band of a second carrier frequency for communication purposes, while the called subscriber substation employs in the second terminal a third carrier frequency for supervisory purposes, and a given side band of the third carrier frequency for communication purposes. Also, in each channel, the called operator switchboard employs in the first terminal the first carrier frequency for supervisory purposes and a given side band of the first carrier frequency for communication purposes, while the calling subscriber substation employs in the second terminal a fourth carrier frequency for supervisory purposes and the given side band of the third carrier frequency for communication purposes. Thus each channel must accommodate not only each of the four carrier frequencies mentioned, but also the given side bands of three of the carrier frequencies mentioned.

While the arrangement is entirely satisfactory in operation, the total number of two-way channels that may be stacked upon one line, without undue interference between the given side bands of the carrier frequencies employed in the several channels, is smaller than is desired.

Accordingly, it is a general object of the present invention to provide in a carrier current telephone system of the character noted, an improved and simplified two-way channel, accommodating the stacking of a larger number of the channels upon a single line than has been heretofore practical.

Another object of the invention is to provide in a telephone system of the character noted, an improved arrangement for setting up connections in a simple and straightforward manner from the operator switchboard to any called one of the subscriber substations.

A further object of the invention is to provide in a telephone system of the character noted, an improved arrangement for setting up connections in a simple and straightforward manner from any calling one of the subscriber substations to the operator switchboard.

Further features of the invention pertain to the particular arrangement of the circuit elements of the telephone system, whereby the above-outlined and additional operating features thereof are attained.

In accordance with the present invention, each of the two-way channels that is operatively associated with the line comprises a first terminal operatively associated with the operator switchboard and a second terminal operatively associated with the switching apparatus. In the channel, the first terminal employs a first carrier frequency for supervisory purposes and a given side band of a second carrier frequency for communication purposes, regardless of whether the connected operator switchboard is the calling or the called station involved in the connection, and the second terminal employs a third carrier frequency for supervisory purposes and a given side band of a fourth carrier frequency for communication purposes, regardless of whether the connected subscriber substation is the calling or called station involved in the connection.

Figure 10:
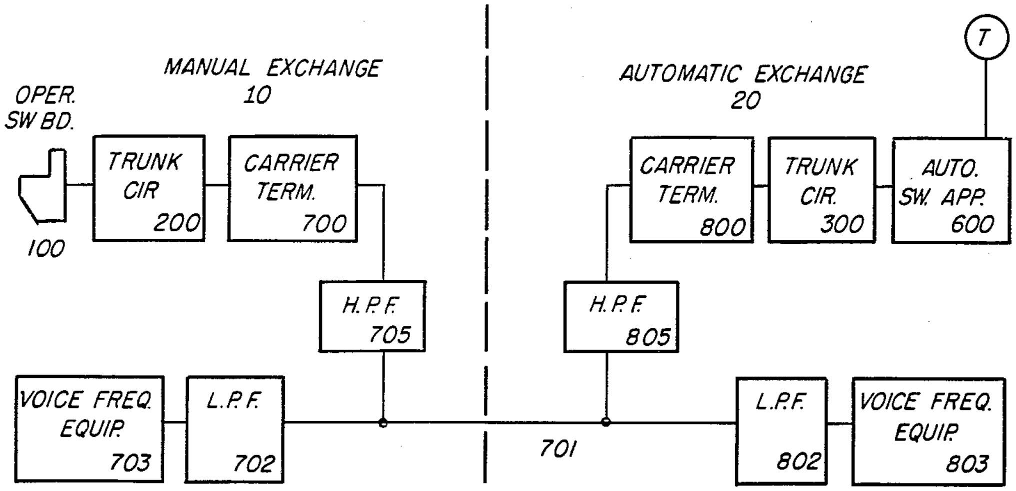

The invention, both as to its organization and method of operation, together with further objects and advantages thereof will best be understood by reference to the following specification taken in connection with the accompanying drawings, in which Figure 10 is a diagrammatic illustration of a telephone system embodying the present invention and comprising a manual exchange 10 and an automatic exchange 20; Figs. 1 to 8, inclusive, taken together, illustrate the details of the apparatus incorporated in the telephone system illustrated in Fig. 10 and embodying the features of the invention, as briefly outlined above; and Fig. 9 illustrates the mode of combining Figs. 1 to 8, inclusive, to form a unified diagram.

Figure 2:
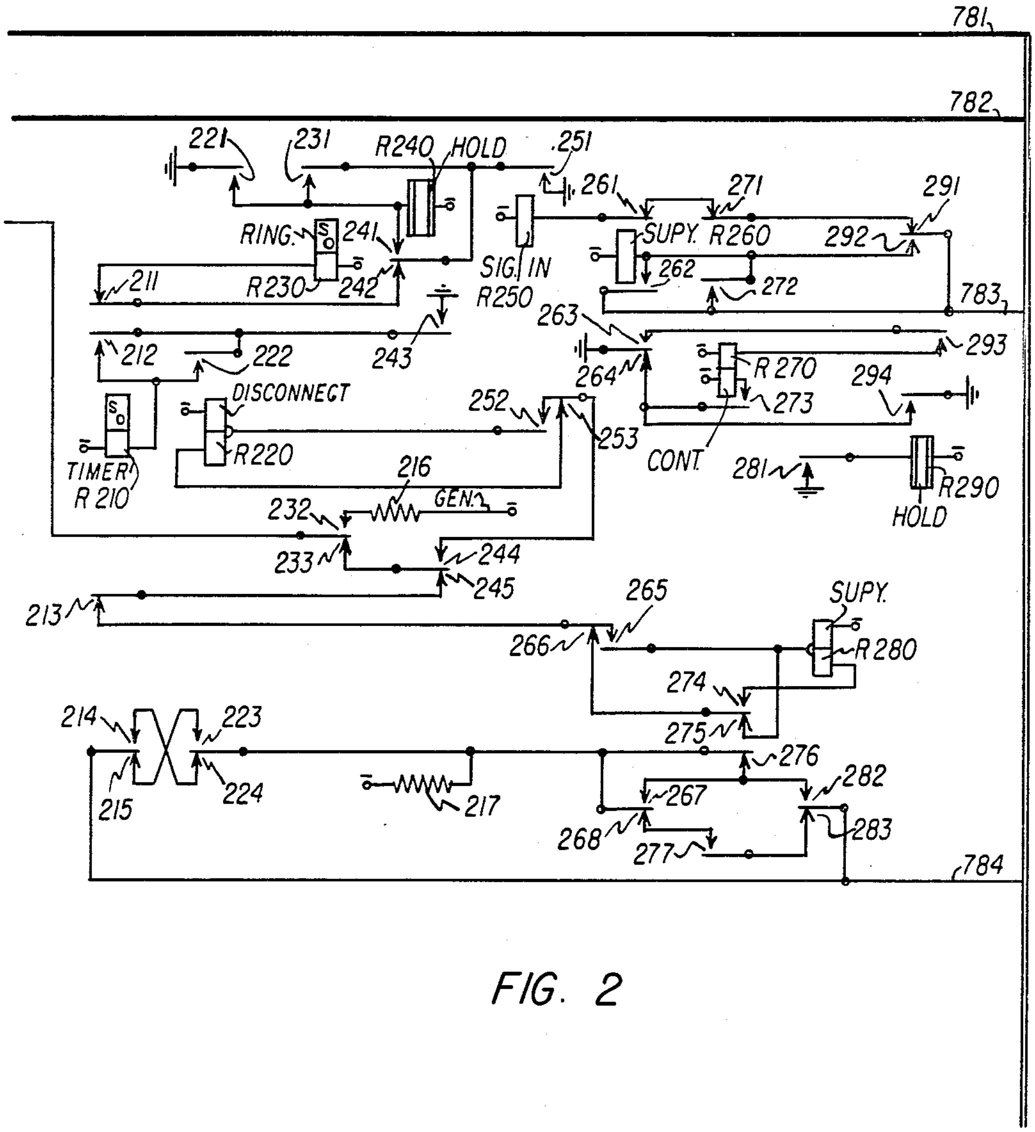
Figure 3:
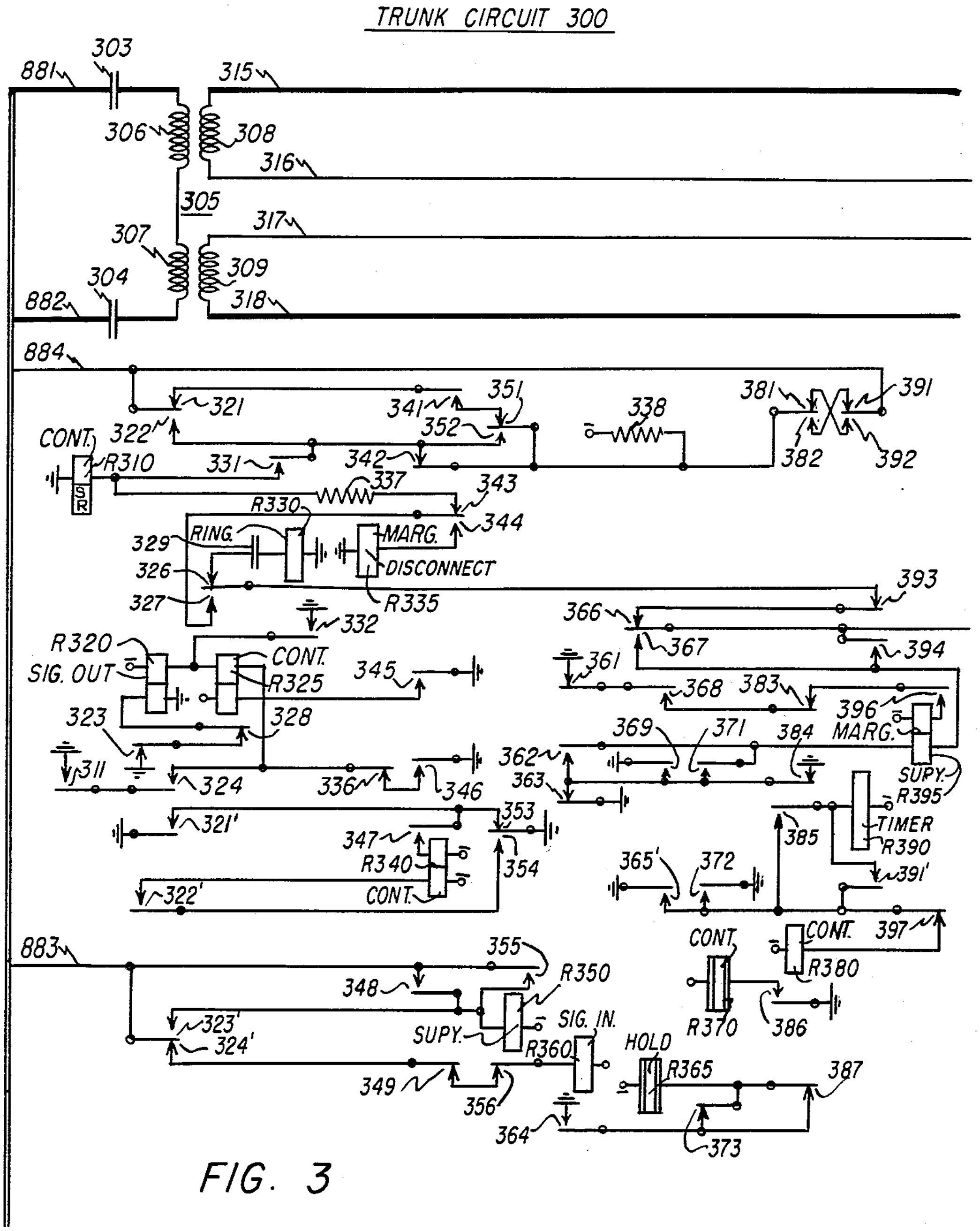
Figure 4:
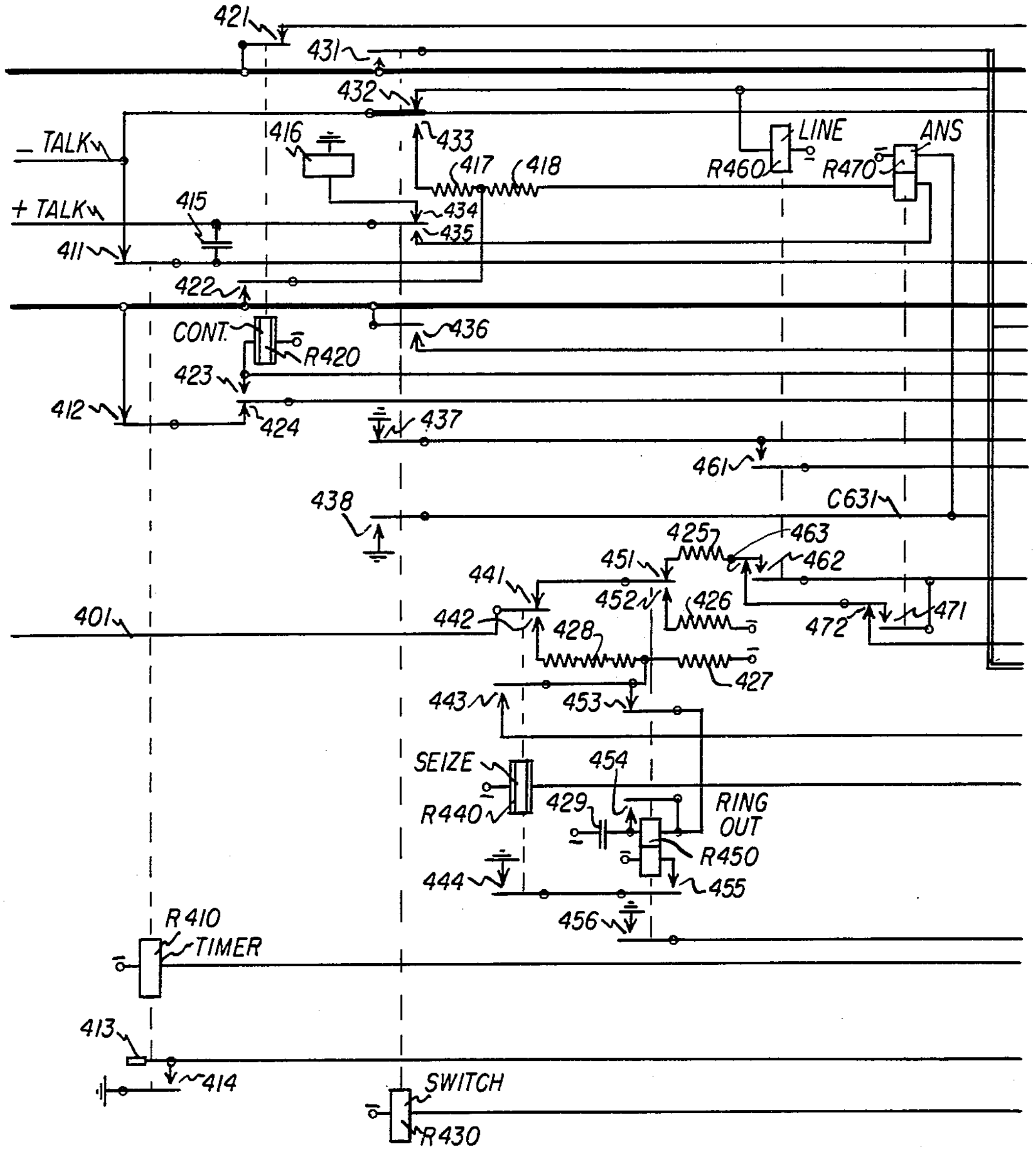
Figure 5:
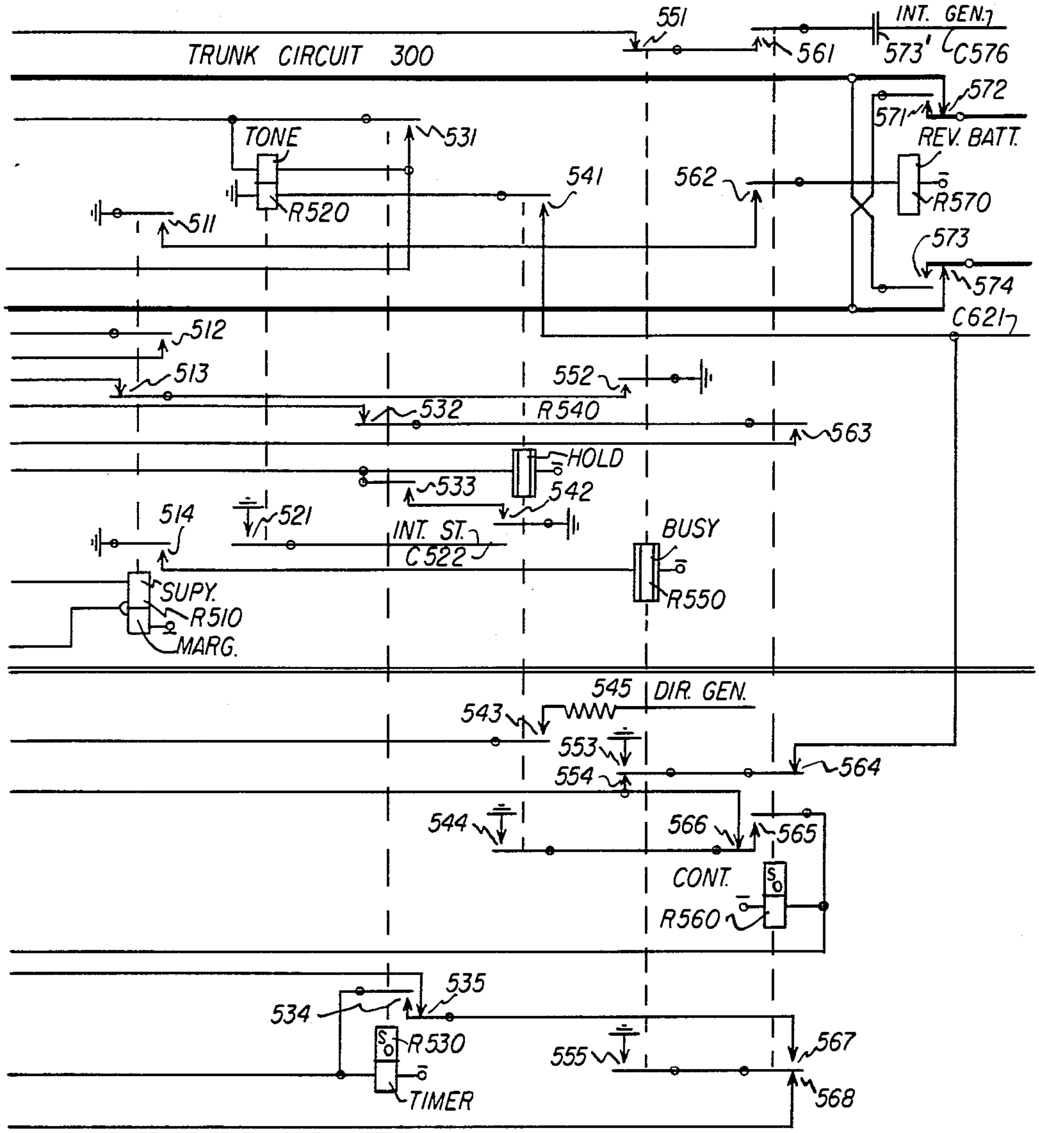
Figure 6:
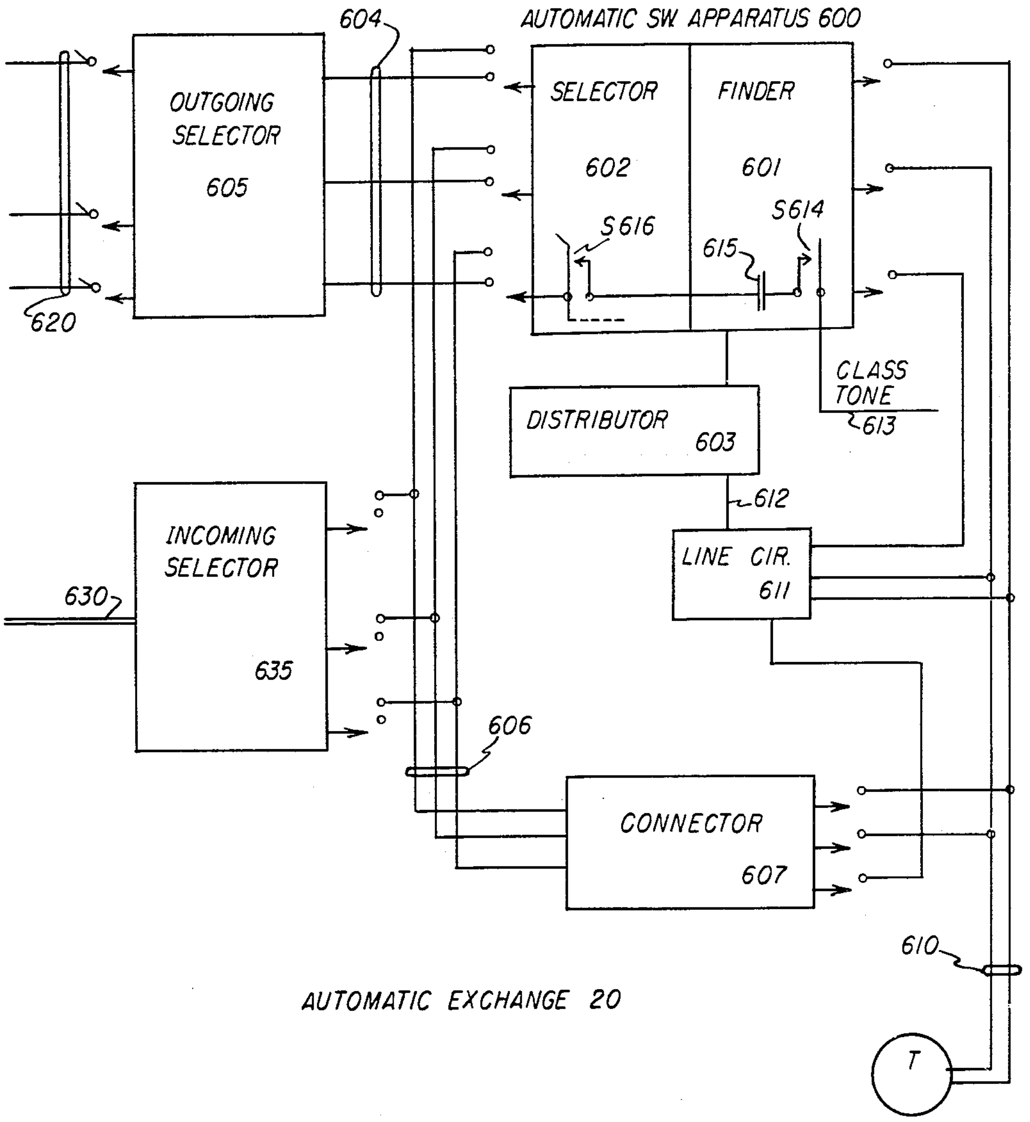

More particularly, Fig. 1 illustrates the details of one of the cord circuits disposed at the operator switchboard in the manual exchange 10; Figs. 1 and 2, taken together, illustrate the details of a trunk circuit disposed in the manual exchange 10; Figs. 3 to 5, inclusive, taken together, illustrate the details of a trunk circuit disposed in the automatic exchange 20; Fig. 6 illustrates the general arrangement of the automatic switching apparatus disposed in the automatic exchange 20; and Figs. 7 and 8 respectively illustrate diagrammatically the carrier terminals respectively disposed in the manual exchange 10 and in the automatic exchange 20, and interconnected by a line extending therebetween.

Referring now more particularly to Fig. 10, the telephone system there illustrated comprises a manual exchange 10 serving a group of subscriber substations, not shown, and an automatic exchange 20 serving a plurality of groups of subscriber substations, one of the groups including the subscriber substation T. The manual exchange 10 and the automatic exchange 20 are interconnected by a line 701 extending therebetween. The west end of the line 701 terminates in voice frequency equipment 703 disposed in or beyond the manual exchange 10; and the east end of the line 701 terminates in voice frequency equipment 803 disposed in or beyond the automatic exchange 20. The manual exchange 10 also comprises an operator switchboard 100; and the automatic exchange 20 comprises automatic switching apparatus 600.

The manual exchange 10 and the automatic exchange 20 are interconnected via the line 701 by a carrier current system, the carrier current system comprising an Adler type SD-1 and includes carrier terminals 700 and 800, respectively disposed in the manual exchange 10 and in the automatic exchange 20. Also the manual exchange 10 comprises a trunk circuit 200 disposed between the operator switchboard 100 and the carrier terminal 700; and the automatic exchange 20 comprises a trunk circuit 300 disposed between the automatic switching apparatus 600 and the carrier terminal 800. More particularly, the carrier terminal 700 disposed in the manual exchange 10 comprises a high-pass line filter 705 directly connected to the west portion of the line 701, and a modulator filter 706 and a demodulator filter 707 connected in parallel to the high-pass line filter 705. Also a low-pass line filter 702 is connected between the west portion of the line 701 and the voice frequency equipment 703. Similarly, the carrier terminal 800 disposed in the automatic exchange 20 comprises a high-pass line filter 805 directly connected to the east portion of the line 701, and a modulator filter 806 and a demodulator filter 807 connected in parallel to the high-pass line filter 805. Also a low-pass line filter 802 is connected between the east portion of the line 701 and the voice frequency equipment 803.

Figure 7:
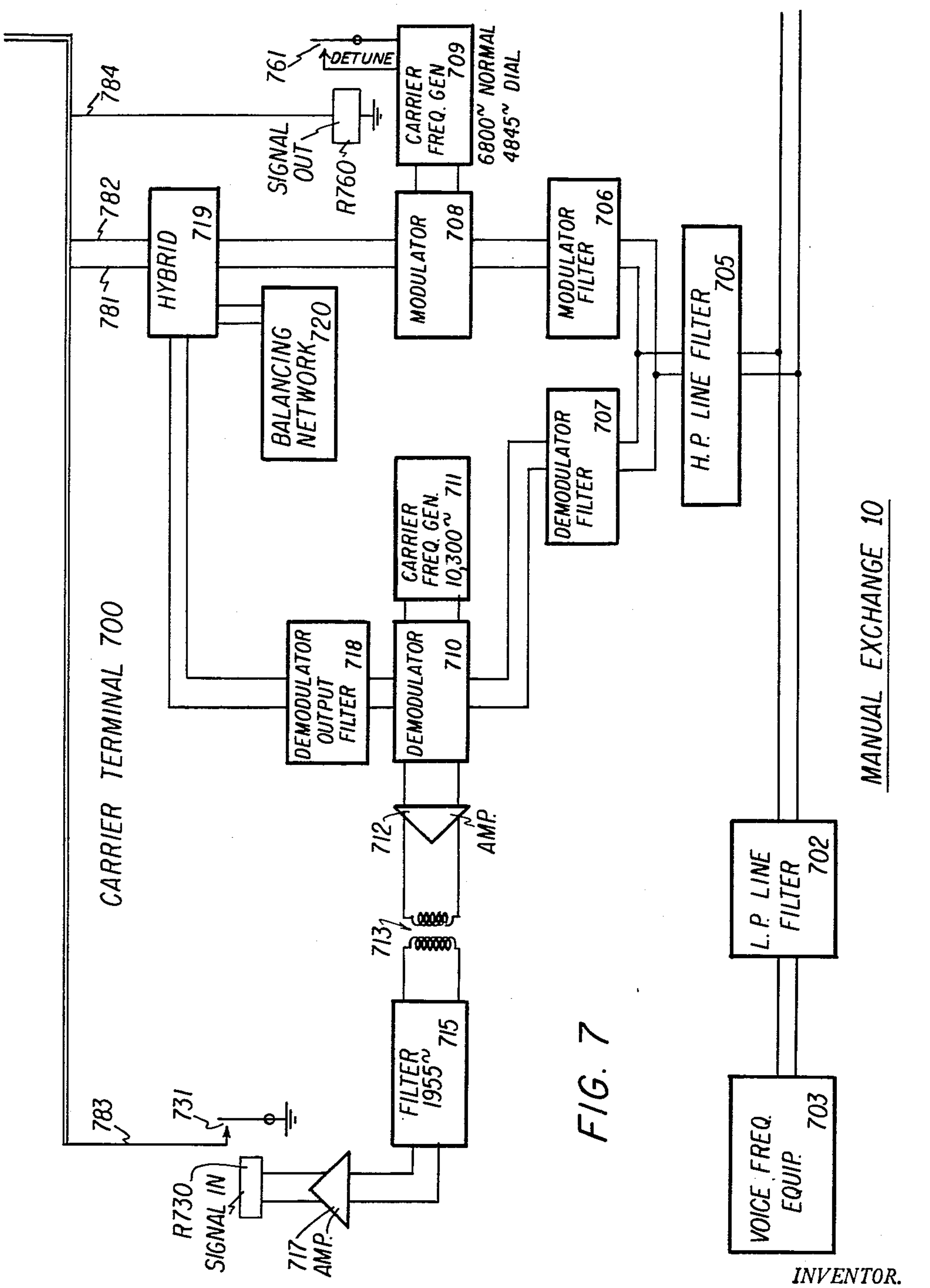

Further, the carrier terminal 700 comprises, as shown in Fig. 7, a modulator 708 connected to the modulator filter 706, and a carrier frequency generator 709 that is capable of generating both a normal frequency of 6800 cycles and a dial frequency of 4845 cycles. The carrier frequency generator 709 is connected to the modulator 708, and the modulator is connected to a hybrid coil 719, that is, in turn, connected to tip and ring conductors 781 and 782 extending to the trunk circuit 200. Further, a balancing network 720 is connected to the hybrid coil 719. Also the carrier terminal 700 comprises a demodulator 710 connected to the demodulator filter 707, and a carrier frequency generator 711 that is capable of generating a frequency of 10,300 cycles. The carrier frequency generator 711 is connected to the demodulator 710, and the demodulator 710 is, in turn, connected via a demodulator output filter 718 to the hybird coil 719 and to the input circuit of an amplifier 712. The output circuit of the amplifier 712 is connected to the primary coil of a coupling transformer 713, and the secondary coil of the coupling transformer 713 is connected to a filter 715 that is tuned to the signal frequency of 1955 cycles; and the filter 715 is further connected to the input circuit of an amplifier 717. Further, the carrier terminal 700 comprises a relay group, including a signal in relay R730 and a signal out relay R760. The output circuit of the amplifier 717 is connected to the winding of the signal in relay R730; and the signal out relay R760 is operative to detune the tank circuit of the carrier frequency generator 709 so as to alter the frequency thereof from the normal frequency of 6800 cycles to the dial frequency of 4845 cycles.

Figure 8:
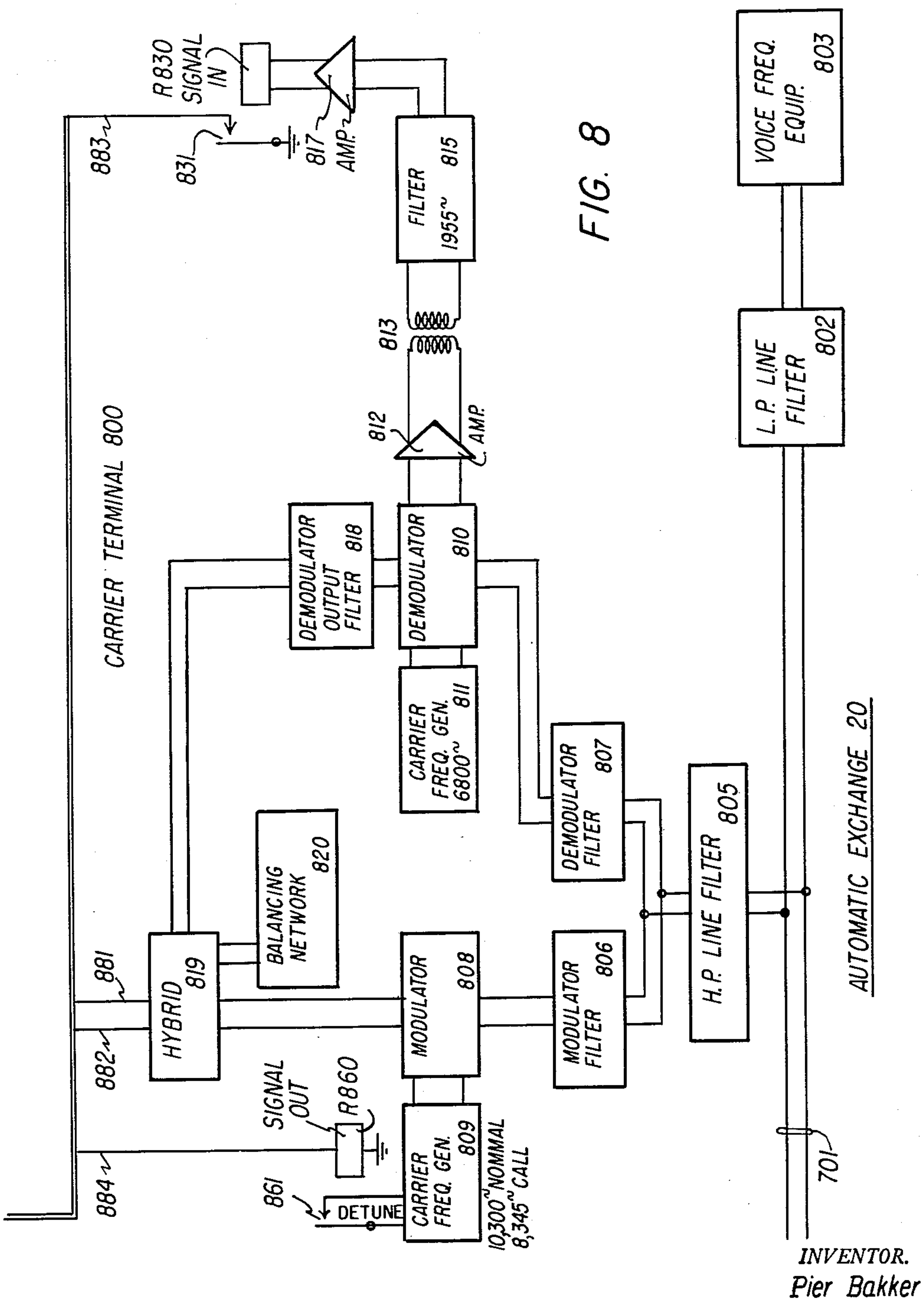
Figure 9:
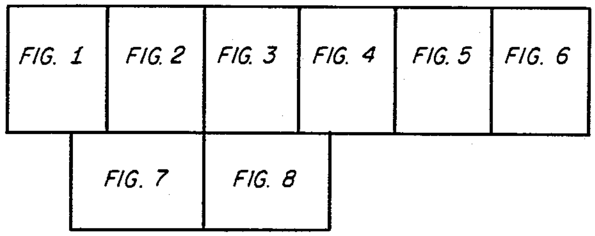

Further, the carrier terminal 800 comprises, as shown in Fig. 8, a modulator 808 connected to the modulator filter 806, and a carrier frequency generator 809 that is capable of generating both a normal frequency of 10,300 cycles and a call frequency of 8345 cycles. The carrier frequency generator 809 is connected to the modulator 808, and the modulator 808 is connected to a hybird coil 819, that is, in turn, connected to tip and ring conductors 881 and 882 extending to the trunk circuit 300. Further, a balancing network 820 is connected to the hybrid coil 819. Also the carrier terminal 800 comprises a demodulator 810 connected to the demodulator filter 807, and a carrier frequency generator 811 that is capable of generating a frequency of 6800 cycles. The carrier frequency generator 811 is connected to the demodulator 810, and the demodulator 810 is, in turn, connected via a demodulator output filter 818 to the hybrid coil 819 and to the input circuit of an amplifier 812. The output circuit of the amplifier 812 is connected to the primary coil of a coupling transformer 813, and the secondary coil of the coupling transformer 813 is connected to a filter 815 that is tuned to the frequency signal of 1955 cycles; and the filter 815 is further connected to the input circuit of an amplifier 817. Further, the carrier terminal 800 comprises a relay group, including a signal in relay R830 and a signal out relay R860. The output circuit of the amplifier 817 is connected to the winding of the signal in relay R830; and the signal out relay R860 is operative to detune the tank circuit of the carrier frequency generator 809 so as to alter the frequency thereof from the normal frequency of 10,300 cycles to the call frequency of 8345 cycles.

In view of the foregoing, it will be understood that when the carrier terminal 700 is the calling terminal, the signal out relay R760 is operated to detune the tank circuit of the carrier frequency generator 709 so that the dial frequency of 4845 cycles is generated and supplied to the modulator 708, and thence via the modulator filter 706 and the high-pass line filter 705 to the line 701. At this time, the carrier terminal 800 is the called terminal and the tank circuit of the carrier frequency generator 809 is tuned to produce the carrier frequency of 10,300 cycles and to supply this carrier frequency to the modulator 808, whereby the lower side band of the carrier frequency of 10,300 cycles is supplied from the modulator 808 via the modulator filter 806 and the high-pass line filter 805 to the line 701. In the called carrier terminal 800 the carrier frequency of 4845 cycles supplied via the high-pass line filter 805 and the demodulator filter 807 to the demodulator 810 is beat therein with the carrier frequency of 6800 cycles supplied thereto from the carrier frequency generator 811 to produce the signal frequency of 1955 cycles, which signal frequency is automatically detected and supplied to the winding of the signal in relay R830 for dial control purposes. In the calling carrier terminal 700, the carrier frequency of 10,300 cycles supplied via the high-pass line filter 705 and the demodulator filter 707 to the demodulator 710 is negated therein by the carrier frequency of 10,300 cycles supplied thereto from the carrier frequency generator 711.

Also, in view of the foregoing, it will be understood that when the carrier terminal 800 is the calling terminal, the signal out relay R860 is operated to detune the tank circuit of the carrier frequency generator 809 so that the call frequency of 8345 cycles is generated and supplied to the modulator 808 and thence via the modulator filter 806 and the high-pass line filter 805 to the line 701. At this time, the carrier terminal 700 is the called terminal and the tank circuit of the carrier frequency generator 709 is tuned to produce the normal carrier frequency of 6800 cycles and to supply this carrier frequency to the modulator 708, whereby the lower side band of the carrier frequency of 6800 cycles is supplied from the modulator 708 via the modulator filter 706 and the high-pass line filter 705 to the line 701. In the called carrier terminal 700, the call frequency of 8345 cycles supplied via the high-pass line filter 705 and the demodulator filter 707 to the demodulator 710 is beat therein with the carrier frequency of 10,300 cycles supplied thereto from the carrier frequency generator 711 to produce the signal frequency of 1955 cycles, which signal frequency is automatically detected and supplied to the winding of the signal in relay R730 for call control purposes. In the calling carrier terminal 800, the carrier frequency of 6800 cycles supplied via the high-pass line filter 805 and the demodulator filter 807 to the demodulator 810 is negated therein by the carrier frequency of 6800 cycles, supplied thereto from the carrier frequency generator 811.

Finally, it will be understood that after a connection has been set-up involving the operator switchboard 100 in the manual exchange 10 and one of the subscriber substations in the automatic exchange 20, and regardless of the direction thereof, the carrier terminals 700 and 800 are returned to their normal conditions wherein they respectively supply the carrier frequencies 6800 cycles and 10,300 cycles to the line 701. Thus after the connection has been established, audio signals from the operator switchboard 100 are supplied to the hybrid coil 719 and then control the modulator 708 to effect modulation of the carrier frequency 6800 cycles; whereby the demodulator 810 is controlled to demodulate the modulated carrier frequency 6800 cycles and to supply the resulting audio frequency signals to the hybrid coil 819 and thence to the subscriber substation in the automatic exchange 20 involved in the connection. Likewise, audio signals from the subscriber substation in the automatic exchange 20 involved in the connection are supplied to the hybrid coil 819 and then control the modulator 808 to effect modulation of the carrier frequency 10,300 cycles; whereby the demodulator 710 is controlled to demodulate the modulated carrier frequency 10,300 cycles and to supply the resulting audio frequency signals to the hybrid coil 719 and thence to the operator switchboard 100 in the manual exchange 10.

As shown in Fig. 1, the operator switchboard 100 is preferably of the multi-position type that includes the position illustrated, which includes the cord circuit 101, and standard common equipment, including a headset 113, a dial D108 and an interrupter generator 107. Further, the cord circuit 101 comprises two plugs P102 and P103, a dial key K104 operative to connect the dial D108 thereto, a talk key K105 operative to connect the headset 113 thereto, and a ring key K106 operative to connect the interrupter generator 107 thereto. Also the cord circuit 101 comprises a supervisory lamp L111 associated with the plug P102, a supervisory lamp L112 associated with the plug P103, a supervisory relay R130 associated with the supervisory lamp L111, a supervisory relay R140 associated with the supervisory lamp L112, and a dial relay R120 associated with the dial key K104 and with the dial D108.

The trunk circuit 200, shown in Figs. 1 and 2, is connected to the carrier terminal 700, as previously noted; and also the trunk circuit 200 terminates in a jack J151 at the operator switchboard 100. The trunk circuit 200 comprises a line lamp L152, a busy lamp L153, and a relay group, including a signal relay R155, a ring-down relay R160, a sleeve relay R165, a supervisory relay R170, a jack relay R175, a control relay R180, a timer relay R210, a disconnect relay R220, a ring relay R230, a hold relay R240, a signal in relay R250, a supervisory relay R260, a control relay R270, a supervisory relay R280 and a hold relay R290.

As shown in Fig. 6, the subscriber substation T has a subscriber line 610 extending thereto, with which a line circuit 611 is individually associated. The automatic switching apparatus 600 comprises a plurality of groups of finder-selector links, each provided with an associated distributor, and corresponding to the groups of subscriber substations. One of the groups of finder-selector links includes the finder 601 and the selector 602, and is provided with the individually associated distributor 603; which group of finder-selector links is associated with the group of subscriber substations, including the subscriber substation T. Also the automatic switching apparatus 600 comprises a plurality of groups of connectors respectively associated with the groups of subscriber substations. One of the groups of connectors includes the connector 607 and is associated with the group of subscriber substations, including the subscriber substation T. Also the automatic switching apparatus 600 comprises a group of outgoing selectors, including the outgoing selector 605, and an incoming selector 635. More particularly, the finder 601 of the finder-selector link illustrated has access to the subscriber line 610 extending to the subscriber substation T, while the selector 602 of the finder-selector link illustrated has access to the connector 607 by way of the associated trunk 606, and has access to the outgoing selector 605, by way of the associated trunk 604. Also the outgoing selector 605 has access to the outgoing trunk 620 extending into the trunk circuit 300; while the incoming trunk 630 extending from the trunk circuit 300 is terminated in the incoming selector 635. Finally, the incoming selector 635 has access to the connector 607 by way of the associated trunk 606.

Preferably, the finders 601, etc., the selectors 602, etc., the outgoing selectors 605, etc., the incoming selector 635, and the connectors 607, etc., are of the well-known Strowger type. Also the finder 601 comprises a plurality of sets of post-normal switch springs, one of which is indicated at S614. The sets of switch springs are actuated selectively in response to operation of the finder 601 different numbers of steps in the vertical direction in the selection of the corresponding ten line groups; and which sets of switch springs are connected to individually associated class tone conductors. Specifically, the set of switch springs S614 is actuated into closed circuit relation in order to connect the associated class tone conductor C613 to the associated condenser 615 when the finder 601 is operated a predetermined number of steps in the vertical direction to select the ten line group of subscriber lines, including the subscriber line 610 extending to the subscriber substation T illustrated. Thus it will be understood that the subscriber substation T is in a given ten line group rendered a particular class of service, as indicated by the signal present on the class tone conductor C613.

Similarly, the selector 602 comprises a set of post-normal switch springs S616 which is actuated into closed circuit relation when the selector 602 is operated into a predetermined level to select the group of trunks, including the trunk 604, and indicative of a trunk call from the automatic exchange 20 to the manual exchange 10.

As shown in Figs. 3, 4 and 5, the trunk circuit 300 comprises a repeater 305 provided with coils 306 and 307 connected to the carrier terminal 800 and with coils 308 and 309 connected to an associated relay group. The relay group noted comprises a control relay R310, a signal out relay R320, a control relay R325, a ring relay R330, a disconnect relay R335, a control relay R340, a supervisory relay R350, a signal in relay R360, a hold relay R365, a control relay R370, a control relay R380, a timer relay R390, a supervisory relay R395, a timer relay R410, a control relay R420, a switch relay R430, a seize relay R440, a ring out relay R450, a line relay R460, an answer relay R470, a supervisory relay R510, a tone relay R520, a timer relay R530, a hold relay R540, a busy relay R550, a control relay R560, and a reverse battery relay R570.

Again referring to Fig. 7, the low-pass line filter 702 is arranged to pass audio frequency signals on the line 701 to the voice frequency equipment 703 and to block all of the high frequency carrier signals on the line 701 in order to prevent interference with the normal operation of the voice frequency equipment 703. The high-pass line filter 705 is arranged to pass high frequency carrier signals in the overall range 4 kc. to 10.5 kc., and to block the passage of audio frequency signals on the line 701 in order to prevent interference with the carrier system. The modulator filter 706 is arranged to pass carrier frequency signals toward the lower end of the overall carrier frequency range and particularly the carrier frequencies between 4 kc. and 7 kc., and to block carrier frequency signals toward the upper end of the overall carrier frequency range and particularly the carrier frequencies between 7.5 kc. and 10.5 kc. On the other hand, the demodulator filter 707 is arranged to pass carrier frequency signals toward the upper end of the overall carrier frequency range and particularly the carrier frequencies between 7.5 kc. and 10.5 kc., and to block carrier frequency signals toward the lower end of the carrier frequency range and particularly the carrier frequencies between 4 kc. and 7 kc.

Again referring to Fig. 8, the low pass line filter 802 is arranged to pass audio frequency signals on the line 701 to the voice frequency equipment 803, and to block all of the high frequency carrier signals on the line 701 in order to prevent interference with the normal operation of the voice frequency equipment 803. The high-pass line filter 805 is arranged to pass high frequency carrier signals in the overall range 4 kc. to 10.5 kc., and to block the passage of audio frequency signals on the line 701 in order to prevent interference with the carrier system. The modulator filter 806 is arranged to pass carrier frequency signals toward the high end of the overall carrier frequency range and particularly the carrier frequencies between 7.5 kc. and 10.5 kc., and to block carrier frequency signals toward the lower end of the overall carrier frequency range and particularly the carrier frequencies between 4 kc. and 7 kc. On the other hand, the demodulator filter 807 is arranged to pass carrier frequency signals toward the lower end of the overall carrier frequency range and particularly the carrier frequencies between 4 kc., and 7 kc., and to block carrier frequency signals toward the upper end of the carrier frequency range and particularly the carrier frequencies between 7.5 kc. and 10.5 kc.

A better understanding of the connection and arrangement of the apparatus incorporated in the telephone system illustrated in Fig. 10 and briefly described above will be facilitated from the following description of the extension of connections involving the manual exchange 10 and the automatic exchange 20.

Considering now the extension of a connection between the manual exchange 10 and the automatic exchange 20, assume that a call has been extended from a calling subscriber substation, not shown, in the manual exchange 10, to the operator switchboard 100 therein, and that the operator at the switchboard 100 has answered the call utilizing the cord circuit 101. At this time, the plug P103 of the cord circuit 101 has been inserted into the jack terminating the subscriber line extending to the calling subscriber substation and the talk key K105 has been operated in order to connect the operator headset 113 to the cord circuit 101. At this time, the operater at the switchboard 100 learns that the subscriber at the calling subscriber substation in the manual exchange 10 desires to converse with a subscriber in the automatic exchange 20, such, for example, as the subscriber at the called subscriber substation T. The operator at the switchboard 100 observes the condition of the trunk circuit 200 as indicated by the corresponding busy lamp L153, and inserts the plug P102 into the jack J151, assuming that the trunk circuit 200 is idle at this time, as indicated by the unlighted busy lamp L153.

When the plug P102 is inserted into the jack J151, the contacts 151′ thereof are operated, completing a circuit for operating the jack relay R175 in the trunk circuit 200. Upon operating, the jack relay R175 completes, at the contacts 176, a circuit for illuminating the busy lamp L153 in order to indicate the busy condition of the trunk circuit 200 at this time; also the jack relay R175 completes, at the contacts 175′, a series circuit for energizing the upper winding of the sleeve relay R165 in the trunck circuit 200 and the winding of the supervisory relay R130 in the cord circuit 101, the circuit including the sleeve of the jack J151, the sleeve of the plug P102, and the contacts 121. When this series circuit is completed, the sleeve relay R165 operates; however, the supervisory relay R130 does not operate as it is of the marginal type. Upon operating, the sleeve relay R165 completes, at the contacts 166 and 168, connections between the tip and ring conductors 781 and 782 and the tip and ring of the jack J151; and completes, at the contacts 165′ a series circuit, including the contacts 178, 233, 245, 213, 266 and 275, for energizing the winding of the supervisory relay R170 and the upper winding of the supervisory relay R280. When this series circuit is completed, both of the relays mentioned operate; the relay R170 being of the marginal type operates by virtue of the energization of the low resistance upper winding of the supervisory relay R280. Upon operating, the supervisory relay R170 completes, at the contacts 171, a circuit for operating the control relay R180. Upon operating, the control relay R180 completes, at the contacts 181, a termination circuit, including the resistor 172 and the condenser 173, across the tip and ring conductors 781 and 782; and completes, at the contacts 182, a circuit for energizing the lower winding of the sleeve relay R165 in multiple with the upper winding thereof. When the upper and lower windings of the sleeve relay R165 are thus energized in multiple and in series relation with the winding of the supervisory relay R130, the latter relay operates, it being of the marginal type, completing at the contacts 131, a circuit for illuminating the supervisory lamp L111 so as to indicate to the operator at the switchboard 100 that the trunk circuit 200 has been seized and that she may proceed with dialing.

Upon operating, the supervisory relay R280 completes, at the contact 281, a circuit for operating the hold relay R290; and completes, at the contacts 282, a path, including the contacts 276, for applying battery potential via the resistor 217 to the signal out conductor 784 so as to effect operation of the signal out relay R760 in the carrier terminal 700. Upon operating the signal out relay R760 completes, at the contacts 761, the circuit for detuning the tank circuit of the carrier frequency generator 709 in order to cause the dial frequency 4845 cycles to be generated by the carrier frequency generator 709 and supplied to the modulator 708. The dial frequency 4845 cycles is impressed by the modulator 708 via the modulator filter 706 and the high-pass line filter 705 upon the line 701; whereby the dial frequency 4845 cycles is impressed from the line 701 via the high-pass line filter 805 and the demodulator filter 807 upon the demodulator 810 in the carrier terminal 800. In the demodulator 810 the dial frequency 4845 cycles is beat with the carrier frequency 6800 cycles produced by the carrier frequency generator 811 that is connected thereto in order to produce the signal frequency 1955 cycles. The signal frequency 1955 cycles is amplified by the amplifier 812 and impressed upon the primary coil of the coupling transformer 813; whereby the secondary coil of the coupling transformer 813 impresses this signal frequency 1955 cycles upon the filter 815 that is tuned thereto so this signal frequency 1955 cycles passes through the filter 815 and is impressed upon the amplifier 817. The amplifier 817 detects the signal frequency 1955 cycles and effects operation of the signal in relay R830. Upon operating, the signal in relay R830 completes, at the contacts 831 a path for applying ground potential to the signal in conductor 883 so as to complete a circuit, including the contacts 324′, 349 and 356, for operating the signal in relay R360 in the trunk circuit 300.

Upon operating, the signal in relay R360 completes, at the contacts 364, a circuit, including the multiple connected contacts 373 and 387, for operating the hold relay R365. Upon operating the hold relay R365 completes, at the contacts 369 and 367, a path for applying ground potential via the contacts 362 and the lower winding of the supervisory relay R395 to the dial conductor 401; and battery potential is applied by way of the lower winding of the supervisory relay R510, the contacts 472 and 463, the resistor 425, and the contacts 451 and 441 to the dial conductors 401; whereby the lower winding of the supervisory relay R395 and the lower winding of the supervisory relay R510 are energized in series circuit relation causing the relays noted to operate. In passing, it is noted that the supervisory relay R395 is of the marginal type, but is operated in the present instance by virtue of the energization of the low resistance lower winding of the supervisory relay R510.

Upon operating, the supervisory relay R510 completes, at the contacts 514, a circuit for operating the busy relay R550. Upon operating, the busy relay R550 completes, at the contacts 553, a path, including the contacts 564, for applying ground potential to the control conductor 621 of the outgonig trunk 620 in order to mark the trunk 620 as busy to the outgoing selectors 605, etc., having access thereto. Also upon operating, the busy relay R550 completes, at the contacts 555, a circuit, including the contacts 568, for operating the switch relay R430. Upon operating, the switch relay R430 completes, at the contacts 438, a circuit for energizing the upper winding of the answer relay R470, rendering the latter relay operative in response to the subsequent energization of the lower winding thereof in a predetermined direction, the answer relay R470 being of the polarized type. Also the switch relay R430 completes, at the contacts 438, a parallel path for applying ground potential to the control conductor 631 of the incoming trunk 630 extending to the incoming selector 635. Further, the switch relay R430 interrupts, at the contacts 432, the normal connection between the winding of the line relay R460 and the −talk conductor 316; interrupts, at the contacts 434, the normal connection between the impedence element 416 and the +talk conductor 317; and completes, at the contacts 431, 433, 435 and 436, a path for bridging the lower winding of the answer relay R470 across the line conductors of the incoming trunk 630 extending to the incoming selector 635. Specifically the −line conductor of the trunk 630 is connected via the contacts 431, the −conductor 315, the coil 308, the −talk conductor 316, the contacts 433, the resistors 417 and 418, the lower winding of the answer relay R470, the contacts 435, the +talk conductor 317, the coil 309, the +conductor 318, and the contacts 436 and 512 to the +line conductor of the trunk 630. When the lower winding of the answer relay R470 is thus bridged across the line conductors of the trunk 630 and ground potential is applied to the control conductor 631 of the trunk 630, the incoming selector 635 is seized and rendered responsive to the subsequent transmission of a digit thereto.

The operator at the switchboard 100 operates the dial key K104 and then proceeds to operate the dial D108 in accordance with the first digit of the directory number of the called subscriber substation T1 in the automatic exchange 20. When the dial D108 is thus operated, the off normal springs 109 thereof are first actuated into engagement, thereby to complete a circuit, including the right-hand contacts of the dial key K104, for operating the dial relay R120 in the cord circuit 101. Upon operating, the dial relay R120 interrupts, at the contacts 121, the previously traced series circuit for energizing the winding of the supervisory relay R130 in the cord circuit 101 and the upper winding of the sleeve relay R165 in the trunk circuit 200; whereby the relays mentioned restore. Upon restoring, the supervisory relay R130 interrupts, at the contacts 131, the circuit for illuminating the supervisory lamp L111; and upon restoring the sleeve relay R165 interrupts, at the contacts 165', the series circuit for energizing the winding of the supervisory relay R170 and the upper winding of the supervisory relay R280 so as to cause the supervisory relay R170 to restore. Upon restoring, the supervisory relay R170 interrupts, at the contacts 171, the circuit for retaining operated the control relay R180; and upon restoring the control relay R180 interrupts, at the contacts 181, the termination circuit, including the resistor 172 and the condenser 173, across the tip and ring conductors 781 and 782. Further, the control relay R180 interrupts, at the contacts 182, a further point in the circuit for energizing the lower winding of the sleeve relay R165 in multiple with the upper winding thereof. Also upon restoring, the sleeve relay R165 completes, at the contacts 167 and 169, an alternative circuit, including the contacts 178, 233, 245, 213, 266 and 275, for energizing the upper winding of the supervisory relay R280. The last mentioned circuit also includes the tip and ring of the jack J151, the tip and ring of the plug P102, the left-hand contacts of the dial key K104 and the impulsing contacts 110 of the dial D108. Further, the sleeve relay R165 interrupts, at the contacts 166 and 168, the previously mentioned connections between the tip and ring of the jack J151 and the tip and ring conductors 781 and 782 extending to the hybrid coil 719.

Accordingly, at this time the circuit for energizing the upper winding of the supervisory relay R280 in the trunk circuit 200 includes the impulsing contacts 110 of the dial D108 in the cord circuit 101. Thus when the dial D108 is released and return back to its normal position, the impulsing contacts 110 thereof are operated into disengagement one or more times corresponding to the number of impulses in the digit dialed, effecting corresponding interruptions and recompletions of the above traced circuit for energizing the upper winding of the supervisory relay R280; whereby the supervisory relay R280 follows the impulses of the first digit of the directory number of the called subscriber substation T dialed by the operator upon the dial D108 at the switchboard 100. At the conclusion of the first digit when the dial D108 in the cord circuit 101 is returned to its normal position, the impulsing contacts 110 thereof are maintained closed and the off normal contacts 109 thereof are opened to interrupt the circuit for energizing the winding of the dial relay R120. Shortly thereafter, the dial relay R120 restores as it is of the slow-to-release type, recompleting, at the contacts 121, the previously traced circuit for energizing in series the winding of the supervisory relay R130 and the upper winding of the sleeve relay R165. The sleeve relay R165 reoperates; however the supervisory relay R130 does not immediately reoperate as it is of the marginal type. Upon reoperating, the sleeve relay R165 recompletes, at the contacts 165', the original circuit for energizing the winding of the supervisory relay R170 in series with the upper winding of the supervisory relay R280 so as to effect reoperation of the supervisory relay R170 and to retain the supervisory relay R280 in its operated position. Upon reoperating, the supervisory relay R170 recompletes, at the contacts 171, the circuit for reoperating the control relay R180. Upon reoperating, the control relay R180 recompletes, at the contacts 181, the termination circuit, including the resistor 172 and the condenser 173, across the tip and ring conductors 781 and 782; and recompletes at the contacts 182, the circuit for energizing the lower winding of the sleeve relay R165 in multiple with the upper winding therein; whereby the supervisory relay R130 is reoperated, the latter relay being of the marginal type. Upon reoperating, the supervisory relay R130 recompletes, at the contacts 131, the circuit for illuminating the supervisory lamp L111 so as to indicate that the call has not yet been answered at the called subscriber substation T in the automatic exchange 20.

Also, the sleeve relay R165 again interrupts, at the contacts 167 and 169, the previously traced alternative dialing circuit for energizing the upper winding of the supervisory relay R280; and recompletes, at the contacts 166 and 168, the previously mentioned connection between the tip and ring of the jack J151 and the line conductors 781 and 782.

Accordingly, the supervisory relay R280 in the trunk circuit 200 follows the impulses of the first digit of the directory number of the called subscriber substation T in the automatic exchange 20, and repeats, at the contacts 283, the impulses mentioned over the signal out conductor 784 to the signal out relay R760 in the carrier terminal 700 causing the latter relay to follow in a similar manner. Each time the signal out relay R760 restores and then reoperates, it interrupts and then recompletes, at the contacts 761, the detuning circuit extending to the tank circuit of the carrier frequency generator 709; whereby the carrier frequency generator 709 generates alternatively the dial frequency 4845 cycles and the carrier frequency 6800 cycles. Specifically, the carrier frequency generator 709 generates the dial frequency 4845 cycles when the signal out relay R760 is operated and generates the carrier frequency 6800 cycles when the signal out relay R760 is restored. The dial frequency 4845 cycles and the carrier frequency 6800 cycles are impressed alternatively by the modulator 708 via the modulator filter 706 and the high-pass line filter 705 upon the line 701 in accordance with the impulses of the first digit as the signal out relay R760 follows.

In the carrier terminal 800, when the dial frequency 4845 cycles is impressed upon the demodulator 810, the signal frequency 1955 cycles is produced, whereby the signal in relay R830 is operated, as previously explained. On the other hand, when the carrier frequency 6800 cycles is employed upon the demodulator 810, there is no signal frequency supplied to the amplifier 812, whereby the signal in relay R860 restores. Accordingly, the signal in relay R830 follows the series of the impulses of the first digit dialed at the operator switchboard 100 in the manual exchange 10. Each time the signal in relay R830 restores and then reoperates, it interrupts and then recompletes, at the contacts 831, the path for applying ground potential to the signal in conductor 883, whereby the signal in relay R360 in the trunk circuit 300 follows. Each time the signal in relay R360 restores and then reoperates, it completes and then interrupts, at the contacts 361, a circuit, including the contacts 368, 383 and 396, for energizing the upper winding of the supervisory relay R395; and each time the signal in relay R360 restores and then reoperates, it interrupts and then recompletes, at the contacts 362, the previously traced circuit for energizing the lower winding of the supervisory relay R395 in series with the lower winding of the supervisory relay R510. Accordingly, the upper and lower windings of the supervisory relay R395 are alternatively energized in order to cause the latter relay to remain in its operated position during impulsing; however, the lower winding of the supervisory relay R510 is deenergized repeatedly in accordance with the impulses of the first digit causing the latter relay to follow. Each time the supervisory relay R510 restores and then reoperates, it interrupts and then recompletes, at the contacts 512, the loop circuit extending between the lower winding of the answer relay R470 and the incoming selector 635, via the line conductors of the trunk 630. The first time, the supervisory relay R510 restores, it completes, at the contacts 513, a circuit, including the contacts 552, for operating the control relay R420. Upon operating, the control relay R420 completes, at the contacts 422, a path for short-circuiting the resistor 418, the lower winding of the answer relay R470 and the repeater coil 309, in order to improve impulsing over the line conductors of the trunk 630 extending to the incoming selector 635. Each time the supervisory relay R510 operates and then restores, it interrupts and then recompletes, at the contacts 513, the circuit for energizing the winding of the control relay R420; however, the latter relay is retained in its operated postion during impulsing as it is of the slow-to-release type. Further, each time supervisory relay R510 restores and then reoperates, it interrupts and then recompletes, at the contacts 514, the circuit for energizing the winding of the busy relay R550; however, the latter relay is retained in its operated position during impulsing as it is of the slow-to-release type.

At the conclusion of the first digit, the sleeve relay R165 and the supervisory relay R280 in the trunk circuit 200 are retained in their operated position retaining the signal out relay R760 in the carrier terminal 700 in its operated position, retaining the signal in relay R830 in the carrier terminal 800 in its operated position, and retaining the signal in relay R360 in the trunk circuit 300 in its operated position. The signal in relay R360 retains operated the supervisory relays R395 and R510 so that shortly thereafter the control relay R420 is restored, it being of the slow-to-release type. Upon restoring, the control relay R420 interrupts, at the contacts 422, the path for short-circuiting the lower winding of the answer relay R470 so that the lower winding of the answer relay R470 is again inserted into the loop circuit extending via the trunk 630 to the incoming selector 635.

In view of the foregoing, it will be understood that the second and third digits of the directory number of the called subscriber substation T that are dialed by the operator at the switchboard 100 are repeated in a similar manner over the connection including the trunk 630. Specifically, the incoming selector 635 receives the first digit and operates to select the group of connectors, including the connector 607, and then operates automatically to select an idle connector in the group noted. For example, the incoming selector 635 may operate to select the trunk 606 extending to the connector 607, whereby the connector 607 is seized and conditioned to be responsive to the second and third digits transmitted over the line 701. The second and third digits transmitted over the line 701, in the manner explained above, are received by the connector 607; whereby the connector 607 operates to select the subscriber line 610 extending to the called subscriber substation T in the automatic exchange 20. The connector 607 then operates automatically to test the idle or busy condition of the called subscriber substation T.

First assuming that the called subscriber substation T is idle at this time, battery potential appears upon the control conductor of the subscriber line 610 causing the connector 607 to operate in order to seize the subscriber line 610, whereupon ground potential in the connector 607 is applied to the control conductor of the subscriber line 610 in order to mark in the line circuit 611 the subscriber line 610 as busy to the other connectors in the group having access thereto. Also the connector 607 operates to project ringing current over the line conductors of the subscriber line 610 so as to operate the ringer at the called subscriber substation T, and to return ring-back tone current over the line conductors of the trunk 606 and consequently over the incoming selector 635 and the line conductors of trunk 630. This ring-back tone current transverses the coils 308 and 309 of the repeater 305 inducing a corresponding ring-back tone current in the coils 306 and 307 of the repeater 305 that are coupled via the condensers 303 and 304 and the tip and ring conductors 881 and 882 to the hybrid coil 819 in the carrier terminal 800. The ring-back tone current is passed from the hybrid coil 819 to the modulator 808; whereby the carrier frequency 10,300 cycles is modulated thereby and impressed via the modulator filter 806 and the high-pass line filter 805 upon the line 701.

The carrier frequency 10,300 cycles modulated by the ring-back tone current that is impressed upon the line 701 passes through the high-pass line filter 705 and the demodulator filter 707 and is impressed upon the demodulator 710 in the carrier terminal 700. The demodulator 710 demodulates the carrier frequency 10,300 cycles modulated by the ring-back tone current and impresses the resulting ring-back tone signal via the demodulator output filter 718 upon the hybrid coil 719; whereby the ring-back tone current transverses the tip and ring conductors 781 and 782 to the tip and ring of the jack J151 and ultimately via the cord circuit 101 to the operator headset 113. The ring-back tone current received in the operator headset 113 indicates to the operator at the switchboard 100 that the called subscriber substation T in the automatic exchange 20 is being rung by the connector in the automatic switching apparatus 600.

When the subscriber at the called subscriber substation T in the automatic exchange 20 answers the call, the connector 607 switches-through to interrupt the projection of ringing current over the subscriber line 610 extending to the called subscriber substation T, and to interrupt the return of the ring-back tone current over the trunk 606 and the previously traced connection to the operator headset 113 at the switchboard 100 in the manual exchange 10. Also the connector 607 operates to bring about the reversal of polarity over the line conductors of the trunk 606 and consequently over the loop circuit extending back to the answer relay R470 in the trunk circuit 300; whereby the answer relay R470 is poled to operate. Upon operating, the answer relay R470 completes, at the contacts 471, an alternative path for applying battery potential by way of the upper and lower windings of the supervisory relay R510 to the dial conductor 401, this path including the resistor 425 and the contacts 463, 451 and 441. Also the answer relay R470 interrupts, at the contacts 472, the original path for applying battery potential directly via the lower winding of the supervisory relay R510 and the resistor 425 to the dial conductor 401. Accordingly, at this time, the upper and lower windings of the supervisory relay R510 are energized in series via the dial conductor 401 with the lower winding of the supervisory relay R395; whereby the supervisory relay R510 is retained in its operated position and the supervisory relay R395 is restored, the supervisory relay R395 being of the marginal type. Upon restoring, the supervisory relay R395 operates the control relay R380 via a circuit, including the contacts 397 and 365'. Upon operating, the control relay R380 completes, at the contacts 382, a path, including the contacts 391 and the resistor 338, for applying battery potential to the signal out conductor 884 in order to bring about operation of the signal out relay R860 in the carrier terminal 800.

Upon operating, the signal out relay R860 completes, at the contacts 861, the detuning circuit included in the tank circuit of the carrier frequency generator 809 so that the carrier frequency generator 809 is operated to interrupt the generation of the carrier frequency 10,300 cycles and to initiate the generation of the call frequency 8345 cycles, the call frequency 8345 cycles being impressed via the modulator 808, the modulator filter 806 and the high-pass line filter 805 upon the line 701. The call frequency 8345 cycles on the line 701 is impressed via the high-pass line filter 705 and the demodulator filter 707 upon the demodulator 710, whereby the call frequency 8345 cycles is beat with the carrier frequency 10,300 cycles in the demodulator 710 to produce the signal frequency 1955 cycles that is supplied from the demodulator 710 to the amplifier 712 and thence coupled via the coupling transformer 713 and the filter 715 that is tuned to the signal frequency 1955 cycles to the input circuit of the amplifier 717. The signal frequency 1955 cycles is detected by the amplifier 717 effecting operation of the signal in relay R730 in the carrier terminal 700.

Upon operating, the signal in relay R730 completes, at the contacts 731, a path for applying ground potential to the signal in conductor 783 so as to complete a circuit, including the circuits 292, for operating the supervisory relay R260 in the trunk circuit 200. Upon operating, the supervisory relay R260 completes, at the contacts 262, a holding circuit, including the grounded signal in conductor 783, for energizing the winding thereof; and completes, at the contacts 263, a circuit, including the contacts 293, for energizing the upper winding of the control relay R270 in order to cause the latter relay to operate. Upon operating, the control relay R270 completes, at the contacts 273, a holding circuit, including the contacts 294, for energizing the lower winding thereof. Also upon operating the supervisory relay R260 completes, at the contacts 265, an alternative circuit substantially identical to that previously traced for energizing the upper winding of the supervisory relay R280 in series with the winding of the supervisory relay R170; and interrupts, at the contacts 266, the previously traced original circuit for energizing the upper winding of the supervisory relay R280 in series with the winding of the supervisory relay R170. Accordingly, at this time, the supervisory relays R280 and R170 are retained in their operated position. The operated supervisory relay R170 retained operated the control relay R180; whereby the sleeve relay R165 and the supervisory relay R130 are retained in their operated positions. The operated supervisory relay R130 retains the supervisory lamp L111 in the cord circuit 101 illuminated at this time and until the answer controls have been completed. Finally, upon operating the supervisory relay R260 completes, at the contacts 267, an alternative path, including the contacts 282, for applying battery potential via the resistor 217 to the signal out conductor 784; and upon operating the control relay R270 interrupts, at the contacts 276, the original path for applying battery potential via the resistor 217 to the signal out conductor 784.

Reverting to the trunk circuit 300, upon operating the control relay R380 also completes, at the contacts 386, a circuit for operating the control relay R370. Upon operating, the control relay R370 completes, at the contacts 371, a multiple circuit, including the contacts 369, for energizing the lower winding of the supervisory relay R395 in series with the upper and lower windings of the supervisory relay R510; whereby the supervisory relay R510 is retained in its operated position and the supervisory relay R395 is retained in its restored position, the supervisory relay R395 being of the marginal type. Also the control relay R370 completes, at the contacts 372, a multiple circuit, including the contacts 397, for retaining operated the control relay R380. Further, the control relay R380 completes, at the contacts 385, a circuit, including the contacts 365', for energizing the winding of the timer relay R390 in order to cause the latter relay to operate shortly thereafter, it being of the slow-to-operate type. Upon operating, the timer relay R390 completes, at the contacts 391', a holding circuit, including the contacts 372, for energizing the winding thereof; and completes, at the contacts 394, a multiple path around the contacts 367 in the circuit for energizing the lower winding of the supervisory relay R395 in series with the upper and lower windings of the supervisory relay R510. Further, the timer relay R390 interrupts, at the contacts 391, the path for applying battery potential via the resistor 338 to the signal out conductor 884 so as to effect the restoration of the signal out relay R860 in the carrier terminal 800. Upon restoring, the signal out relay R860 interrupts, at the contacts 861, the detuning circuit included in the tank circuit of the carrier frequency generator 809; whereby the carrier frequency generator 809 operates to arrest the production of the call frequency 8345 cycles and to initiate the production of the carrier frequency 10,300 cycles so as to bring about the restoration of the signal in relay R730 in the carrier terminal 700, in the manner previously explained.

Upon restoring, the signal in relay R730 interrupts, at the contacts 731, the path for applying ground potential to the signal in conductor 783 so as to bring about the restoration of the supervisory relay R260 in the trunk circuit 200. Upon restoring, the supervisory relay R260 interrupts, at the contacts 262, a further point in the holding circuit for energizing the winding thereof; interrupts at the contacts 263, the circuit for energizing the upper winding of the control relay R270; and completes, at the contacts 264, a multiple holding circuit, including the contacts 273, for energizing the lower winding of the control relay R270. Also upon restoring, the supervisory relay R260 interrupts, at the contacts 265, the previously traced circuit for energizing the upper winding of the supervisory relay R280 in series with the winding of the supervisory relay R170; and completes, at the contacts 266, an alternative circuit, including the contacts 274, for energizing the upper and lower windings of the supervisory relay R280 in series with the winding of the supervisory relay R170. When the last mentioned circuit is completed, the supervisory relay R280 is retained in its operated position; however, the supervisory relay R170 restores as it is of the marginal type. Upon restoring, the supervisory relay R170 interrupts, at the contacts 171, the circuit for retaining operated the control relay R180. Upon restoring, the control relay R180 interrupts, at the contacts 181, the termination circuit, across the line conductors 781 and 782; and interrupts, at the contacts 182, the circuit for energizing the lower winding of the sleeve relay R165 in multiple with the upper winding thereof. Accordingly at this time, only the upper winding of the sleeve relay R165 is energized in series with the winding of the supervisory relay R130; whereby the sleeve relay R165 in the trunk circuit 200 is retained in its operated position and the supervisory relay R130 in the cord circuit 101 restores as it is of the marginal type. Upon restoring, the supervisory relay R130 interrupts, at the contacts 131, the circuit for illuminating the supervisory lamp L111 associated with the plug P102 in order to render to the operator at the switchboard 100 answer supervision.

Reverting to the trunk circuit 200, upon restoring, the supervisory relay R260 interrupts, at the contacts 267, the previously traced path for applying battery potential via the resistor 217 to the signal out conductor 784 in order to bring about the restoration of the signal out relay R760 in the carrier terminal 700. Upon restoring, the signal out relay R760 interrupts, at the contacts 761, the detuning circuit included in the tank circuit of the carrier frequency generator 709, whereby the carrier frequency generator 709 is operated to interrupt the production of the dial frequency 4845 cycles and to initiate the production of the carrier frequency 6800 cycles thereby to bring about the restoration of the signal in relay R830 in the carrier terminal 800, in the manner previously explained. Upon restoring, the signal in relay R830 interrupts, at the contacts 831, the path for applying ground potential to the signal in conductor 883 so as to effect the restoration of the signal in relay R360 in the trunk circuit 300. Also in the trunk circuit 300, operation of the control relay R370 interrupted, at the contacts 373, the circuit for energizing the winding of the hold relay R365 so as to effect the restoration of the latter relay shortly thereafter, since the hold relay R365 is of the slow-to-release type. Upon restoring, the signal in relay R360 completes, at the contacts 363, an alternative path, including the contacts 371 and the contacts 394, for energizing the lower winding of the supervisory relay R395 in series with the upper and lower windings of the supervisory relay R510 so as to retain the supervisory relay R510 in its operated position subsequent to the restoration of the hold relay R365 as noted above, the supervisory relay R395 being retained in its restored position as it is of the marginal type, as previously explained.

At this time, the operator at the switchboard 100 may converse with the subscriber at the called subscriber substation T in the automatic exchange 20 and with the subscriber at the calling subscriber substation in the manual exchange 10 since a three-way communicaiton connection has now been established. Then the operator may restore the talk key K105 of the cord circuit 101, disconnecting the operator headset 113 from the cord circuit 101; whereby a private connection is then completed between the calling subscriber substation in the manual exchange 10 and the called subscriber substation T in the automatic exchange 20. At this time, transmitter battery is supplied via the windings of the supervisory relay R140, the back contacts of the ring key K106 and the tip and ring of the plug P103 to the calling subscriber substation, whereby the supervisory relay R140 occupies its operated position maintaining interrupted, at the contacts 141, a circuit for illuminating the supervisory lamp L112 in the cord circuit 101. Accordingly the extinguished supervisory lamp L112 and the extinguished supervisory lamp L111 respectively indicate that the calling subscriber substation in the manual exchange 10 and the called subscriber substation T in the automatic exchange 20 are included in the established connection.

At this time, audio frequency signals received from the calling subscriber substation in the manual exchange 10 pass through the cord circuit 101 and thence over the tip and ring of the jack J151 and the line conductors 781 and 782 to the hybrid coil 719 in the carrier terminal 700. The audio frequency signals then pass into the modulator 708 effecting corresponding modulation of the carrier frequency 6800 cycles that is employed at this time upon the line 701. The carrier frequency 6800 cycles modulated by the audio frequency signals then passes over the line 701 and ultimately into the demodulator 810 in the carrier terminal 800, wherein the carrier frequency noted is demodulated and the resulting audio frequency signals are passed via the demodulator output filter 818 to the hybrid coil 819. The audio frequency signals from the hybrid coil 819 then traverse the conductors 881 and 882, the condensers 303 and 304, and the coils 306 and 307 of the repeater 305 in the trunk circuit 300. Corresponding audio frequency signals are induced in the coils 308 and 309 of the repeater 305 and are impressed upon the line conductors of the trunk 630 and thence pass over the incoming selector 635, the trunk 606, the connector 607, and the subscriber line 610 to the called subscriber substation T in the automatic exchange 20.

Also at this time, audio frequency signals received from the called subscriber substation T in the automatic exchange 20 pass over the subscriber line 610, the connector 607, the trunk 606, the incoming selector 635 and the line conductors of the trunk 630 and the coils 308 and 309 of the repeater 305 in the trunk circuit 300. Corresponding audio frequency signals are induced in the coils 306 and 307 of the repeater 305 and pass via the condensers 303 and 304 and the line conductors 881 and 882 to the hybrid coil 819 in the carrier terminal 800 and thence to the modulator 808. The carrier frequency 10,300 cycles is modulated by the audio frequency signals and the resulting carrier frequency 10,300 cycles modulated by the audio frequency signals is impressed upon the line 701 and ultimately passes to the demodulator 710 in the carrier terminal 700. The carrier signal noted is demodulated in the demodulator 710 and the resulting audio frequency signals are passed via the demodulator output filter 718 to the hybrid coil 719. The audio frequency signals pass from the hybrid coil 719 via the line conductors 781 and 782 and the contacts 166 and 168 to the tip and ring of the jack J151 and thence via the cord circuit 101 to the calling subscriber substation in the manual exchange 10.

Now assuming that the called subscriber substation T in the automatic exchange 20 is busy when the connector 607 operates, in the manner previously explained, to select the subscriber line 610 extending thereto, the connector 607 operates in order to cause busy-tone current to be returned over the previously traced connection, including the trunk circuit 300 to the hybrid coil 819 in the carrier terminal 800. The carrier frequency 10,300 cycles is modulated in the modulator 808 by the busy-tone current, whereby the resulting carrier signal is impressed upon the line 701. The carrier frequency 10,300 cycles modulated by the busy-tone current is demodulated in the demodulator 710 in the carrier terminal 700 and the resulting busy-tone signal is returned over the trunk circuit 200 and the cord circuit 101 to the operator headset 113 at the switchboard 100, in the manner previously explained. At this time, the operator at the switchboard 100 advises the subscriber at the calling subscriber substation in the manual exchange 10 that the desired connection cannot be had immediately due to the busy condition of the called subscriber substation T in the automatic exchange 20, and then proceeds to withdraw the plugs P103 and P102 of the cord circuit 101 from the associated jacks. When the plug P102 is withdrawn from the jack J151, the apparatus involved in the connection extending toward the called subscriber substation T in the automatic exchange 20 is released in a manner more fully described hereinafter; and when the plug P103 is withdrawn from the associated jack, the connection to the calling subscriber substation in the manual exchange 10 is taken down.

At the conclusion of the connection, when the subscriber at the calling subscriber substation in the manual exchange 10 replaces the receiver of the telephone instrument thereat upon its associated switchhook, the previously-mentioned circuit for maintaining operated the supervisory relay R140 in the cord circuit 101, is interrupted, whereby the latter relay restores to complete, at the contacts 141, the previously mentioned circuit for illuminating the supervisory lamp L112 in the cord circuit 101. The illumination of the supervisory lamp L112 renders to the operator switchboard 100 disconnect supervision, whereupon the operator at the switchboard 100 withdraws the plug P103 of the cord circuit 101 from the associated jack taking down the connection to the calling subscriber substation in the manual exchange 10.

Assuming that the subscriber at the called subscriber substation T in the automatic exchange 20 replaces the receiver of the telephone instrument thereat upon its associated switchhook before the operator at the switchboard 100 withdraws the plug P102 of the cord circuit 101 from the associated jack J151 terminating the trunk circuit 200, the connector 607 operates to reverse the polarity over the trunk 606, the incoming selector 635 and the incoming trunk 630 to the lower winding of the answer relay R470 in the trunk circuit 300, causing the latter relay to restore as it is of the polarized type. Upon restoring, the answer relay R470 interrupts, at the contacts 471, the path for applying battery potential via the upper and lower windings of the supervisory relay R510 upon the dial conductor 401; and recompletes, at the contacts 472, the path for applying battery potential via the lower winding of the supervisory relay R510 to the dial conductor 401. Accordlingly, at this time, the lower winding of the supervisory relay R510 is energized in series with the lower winding of the supervisory relay R395 causing the latter relay to reoperate, since it is of the marginal type. Upon reoperating, the supervisory relay R395 interrupts, at the contacts 397, the circuit for retaining operated the control relay R380. Upon restoring, the control relay R380 completes, at the contacts 381, an alternative path, including the contacts 392, for applying battery potential via the resistor 338 to the signal out conductor 884, so as to bring about reoperation of the signal out relay R860 in the carrier terminal 800 so that the latter relay causes the carrier frequency generator 809 to interrupt the production of the carrier frequency 10,300 cycles and to initiate the production of the call frequency 8345 cycles, whereby the signal in relay R730 in the carrier terminal 700 is operated. Upon operating, the signal in relay R730 completes, at the contacts 731, the path for applying ground potential to the signal in conductor 783 so as to complete a circuit, including the contacts 272, for reoperating the supervisory relay R260 in the trunk circuit 300. Upon reoperating, the supervisory relay R260 interrupts, at the contacts 266, the previously traced circuit for energizing the upper and lower windings of the supervisory relay R280 in series with the winding of the supervisory relay R170; and recompletes, at the contacts 265, the previously traced circuit for energizing the upper winding of the supervisory relay R280 in series with the winding of the supervisory relay R170. Accordingly, at this time, the supervisory relay R280 is retained in its operated position and the supervisory relay R170 is reoperated, the latter relay being of the marginal type. Upon reoperating, the supervisory relay R170 effects reoperation of the control relay R180, in the manner previously described. Upon reoperating, the control relay R180 recompletes, at the contacts 181, the termination circuit across the line conductors 781 and 782; and recompletes, at the contacts 182, the circuit for energizing the lower winding of the sleeve relay R165 in mutliple with the upper winding thereof; whereby the sleeve relay R165 is retained in its operated position and the supervisory relay R130 in the cord circuit 101 is reoperated. Upon reoperating, the supervisory relay R130 again illuminates the supervisory lamp L111 in order to render to the operator at the switchboard 100 disconnect supervision.

Also upon reoperating, the supervisory relay R260 in the trunk circuit 200 completes, at the contacts 267, the path, including the contacts 282, for applying battery potential via the resistor 217 to the signal out conductor 784 so as to bring about the reoperation of the signal out relay R760 in the carrier terminal 700; whereby the carrier frequency generator 709 is controlled to arrest the production of the carrier frequency 6800 cycles and to initiate the production of the dial frequency 4845 cycles so as to bring about the reoperation of the signal in relay R830 in the carrier terminal 800. Upon reoperating, the signal in relay R830 completes, at the contacts 831, the path for applying ground potential to the signal in conductor 883, so as to complete the circuit, including the contacts 324′, 349 and 356, for reoperating the signal in relay R360 in the trunk circuit 300. Upon operating, the signal in relay R360 completes, at the contacts 364, a circuit, including the contacts 387, for operating the hold relay R365. Also when the control relay R380 restored, it interrupted, at the contacts 386, the circuit for energizing the winding of the control relay R370 so as to cause the latter relay to restore shortly thereafter, it being of the slow-to-release type. However, the hold relay R365 reoperates under the control of the signal in relay R360, as explained above, prior to the restoration of the control relay R370 so as to retain operated the timer relay R390 and the supervisory relays R395 and R510 at this time.

Upon receiving disconnect supervision, the operator at the switchboard 100 withdraws the plug P109 of the cord circuit 101 from the associated jack J151, thereby interrupting the series circuit for maintaining operated the sleeve relay R165 in the trunk circuit 200, and the supervisory relay R130 in the cord circuit 101. The supervisory relay R130 restores to interrupt, at the contacts 131, the circuit for illuminating the supervisory lamp L111; whereby the cord circuit 101 is restored to its normal idle condition. Also, when the plug P102 is withdrawn from the jack J151 the contacts 151′ thereof are opened interrupting the circuit for maintaining operated the jack relay R175 in the trunk circuit 200. Upon restoring, the jack relay R175 interrupts, at the contacts 176, the circuit for illuminating the busy lamp L153 in order to indicate that the trunk circuit 200 has been restored to its normal idle condition. Upon restoring, the sleeve relay R165 interrupts, at the contacts 165′, the series circuit for maintaining operated the supervisory relays R170 and R280. Upon restoring, the supervisory relay R170 interrupts, at the contacts 171, the circuit for retaining operated the control relay R180. Upon restoring, the control relay R180 interrupts, at the contacts 181, the termination circuit across the line conductors 781 and 782. Upon restoring, the supervisory relay R280 interrupts, at the contacts 282, the previously traced path for applying battery potential via the resistor 217 to the signal out conductor 784 in order to bring about the restoration of the signal out relay R760 in the carrier terminal 700 so that the carrier frequency generator 709 is controlled to arrest the production of the dial frequency 4845 cycles and to initiate the production of the carrier frequency 6800 cycles in order to bring about the restoration of the signal in relay R830 in the carrier terminal 800. Upon restoring, the signal in relay R830 interrupts, at the contacts 831, the path for applying ground potential to the signal in conductor 883 in order to bring about the restoration of the signal in relay R360 in the trunk circuit 300.

Reverting to the trunk circuit 200, also upon restoring, the supervisory relay R280 interrupts, at the contacts 281, the circuit for energizing the winding of the hold relay R290 so as to cause the latter relay to restore shortly thereafter, it being of the slow-to-release type. Upon restoring, the hold relay R290 interrupts, at the contacts 293, the circuit for energizing the upper winding of the control relay R270; and interrupts, at the contacts 294, the circuit for energizing the lower winding of the control relay R270, whereby the latter relay restores at this time.

Upon restoring, the signal in relay R360 in the trunk circuit 300 interrupts, at the contacts 364, the circuit for energizing the winding of the hold relay R365 so as to cause the latter relay to restore shortly thereafter, it being of the slow-to-release type. Upon restoring, the hold relay R365 interrupts, at the contacts 365′, the circuit for retaining operated the timer relay R390. Further, the signal in relay R360, upon restoring, interrupts, at the contacts 362, the circuit for energizing the lower winding of the supervisory relay R395 in series with the lower winding of the supervisory relay R510 so as to effect the restoration of these relays. Upon restoring, the timer relay R390 interrupts, at the contacts 392, the path for applying battery potential via the resistor 338, to the signal out conductor 884, so as to bring about the restoration of the signal out relay R860 in the carrier terminal 800. Upon restoring, the signal out relay R860 controls the carrier frequency generator 809 to interrupt the production of the call frequency 8345 cycles and to initiate the production of the carrier frequency 10,300 cycles in order to bring about the restoration of the signal in relay R730 in the carrier terminal 700. Upon restoring, the signal in relay R730 interrupts, at the contacts 731, the path for applying ground potential to the signal in conductor 783 so as to effect the restoration of the supervisory relay R260 in the trunk circuit 200. At this time, the trunk circuit 200 is completely released.

Upon restoring, the supervisory relay R510 interrupts, at the contacts 514, the circuit for energizing the winding of the busy relay R550 in order to cause the latter relay to restore shortly thereafter, it being of the slow-to-release type. Upon restoring, the busy relay R550 interrupts, at the contacts 555, the circuit for retaining operated the switch relay R430; and interrupts, at the contacts 553, the path for applying ground potential to the control conductor 621 of the trunk 620. Upon restoring, the switch relay R430 interrupts, at the contacts 431, 433, 435 and 436, the connections between the lower winding of the answer relay R470 and the line conductors of the trunk 630, extending to the incoming selector 635. Further, the switch relay R430 interrupts, at the contacts 438, the circuit for energizing the upper winding of the answer relay R470 and the multiple path for applying ground potential to the control conductor of the trunk 630 extending to the incoming selector 635.

When the loop circuit extending from the lower winding of the answer relay R470 in the trunk circuit 300 via the trunk 630, the incoming selector 635 and the trunk 606 to the connector 607 is thus interrupted, the connector 607 is released in order to remove ground potential from the control conductor of the subscriber line 610 extending to the line circuit 611; whereby battery potential in the line circuit 611 is returned upon the control conductor of the subscriber line 610 in order again to mark the subscriber line 610 as idle to the connectors in the group, including the connector 607, having access thereto. Also when the connector 607 is thus released, ground potential therein is removed from the control conductor of the trunk 606 bringing about the release of the incoming selector 635 and the reapplication of battery potential in the connector 607 to the control conductor of the trunk 606 in order again to mark the trunk 606 as idle to the incoming selector 635, etc., having access thereto.

Also upon restoring, the busy relay R550 interrupts, at the contacts 553, the path for applying ground potential to the control conductor of the trunk 520; and completes, at the contacts 554, the normal path, including the contacts 564, for applying battery potential via the winding of the seize relay R440 to the control conductor 621 of the trunk 620. Accordingly, at this time, the trunk 620 and consequently the trunk circuit 300 is marked as idle to the outgoing selectors 605, etc., having access thereto. At this time, the trunk circuit 200, the trunk circuit 300, and the carrier system, as well as the automatic switching apparatus 600, are completely released and available for further use.

Considering now the extension of a connection between the automatic exchange 20 and the manual exchange 10, assume that a call is initiated at the calling subscriber substation T in the automatic exchange 20, the line circuit 611 individual to the subscriber line 610 extending to the calling subscriber substation T operates in order to ground the start conductor 612 extending to the distributor 603. The distributor 603 operates to assign an idle one of the finder-selector links in the associated group, such for example as the link illustrated; whereby the finder 601 thereof operates to find the subscriber line 610 extending to the calling subscriber substation T. When the finder 601 finds the subscriber line 610, ground potential is applied to the control conductor thereof in order to mark the subscriber line 610 as busy to the connectors 607, etc. having access thereto; and the line circuit 611 dismisses the distributor 603. It is noted that the calling subscriber substation T is included in a ten line group rendered a particular class of service, whereby the set of switch springs S614 in the finder 601 is actuated into engagement incident to operation of the finder 601 to find the subscriber line 610 extending to the calling subscriber substation T. When the set of switch springs S614 is thus actuated, the class tone conductor 613 is connected via the condenser 615 to the set of switch springs S616, for a purpose more fully explained hereinafter.

The subscriber at the calling subscriber substation T then dials the first digit of the directory number of the called operator switchboard 100 in the manual exchange 10; whereby the selector 602 is operated to select the group of trunks, including the trunk 604, and is then operated automatically to select an idle trunk in the group noted. For example, the selector 602 may operate to select the particular trunk 604 extending to the outgoing selector 605; whereby the loop circuit is extended from the calling subscriber substation T into the outgoing selector 605 in a conventional manner. At this time, since the present call constitutes a trunk call, the set of switch springs S616 is actuated into engagement, thereby to extend the class tone conductor 613 over the control conductor of the trunk 604 to the outgoing selector 605. The outgoing selector 605 then responds to the second digit of the directory number of the called operator switchboard 100 in the manual exchange 10 in order to select the level of the trunk 620 and then operates automatically to select the particular trunk 620 extending to the trunk circuit 300, assuming that the trunk circuit 300 is idle at this time. The trunk circuit 300 is marked as idle at this time by the application of battery potential upon the control conductor 621 of the outgoing trunk 620. Specifically, battery potential is applied by way of the winding of the seize relay R440 and the contacts 554 and 564 to the control conductor 621. Also when the outgoing selector 605 selects the outgoing trunk 620 it switches through applying ground potential therein to the control conductor 621 of the outgoing trunk 620, in order to complete a circuit substantially identical to that previously traced for operating the seize relay R440 in the trunk circuit 300. Further the class tone conductor 613 is extended through the outgoing selector 605 to the control conductor 621 of the outgoing trunk 620; whereby the class tone signal appears upon the control conductor 621 of the outgoing trunk 620 for a purpose more fully explained hereinafter. Further, upon switching-through, the outgoing selector 605 extends the loop circuit from the calling subscriber substation T to the line relay R460 and to the impedance element 416 in the trunk circuit 300. Specifically ground potential is applied by way of the impedance element 416, the contacts 434, the +talk conductor 317, the coil 309, the +conductor 318 and the contacts 574 to the +conductor of the outgoing trunk 620; and battery potential is applied by way of the line relay R460, the contacts 432, the −talk conductor 316, the coil 308, the −conductor 315 and the contacts 572 to the −conductor of the outgoing trunk 620; and the line conductors of the outgoing trunk 620 are connected via the outgoing selector 605, the line conductors of the trunk 604, the selector 602, and the finder 601 to the line conductors of the subscriber line 610 and thence to the bridge at the calling subscriber substation T. When the above-traced loop circuit is thus completed, the line relay R460 operates.

Upon operating, the line relay R460 completes, at the contacts 461, a circuit, including the contacts 437, for operating the hold relay R540. Upon operating, the hold relay R540 completes, at the contacts 543, a connection, including the contacts 443 and 453, for ringing via the resistor 545 and the condenser 429 from the direct generator conductor through the upper winding of the ring out relay R450, whereby the latter relay is operated. Upon operating, the ring out relay R450 completes, at the contacts 455, a holding circuit, including the contacts 444, for energizing the lower winding thereof; completes, at the contacts 454, a path for short-circuiting the upper winding thereof; and interrupts, at the contacts 453, a point in the above-traced ringing circuit for energizing the upper winding thereof. Also the ring out relay R450 completes, at the contacts 456, a circuit for energizing the winding of the control relay R560 in order to cause the latter relay to operate shortly thereafter, it being of the slow-to-operate type. Upon operating, the control relay R560 completes, at the contacts 565, a holding circuit, including the contacts 544, for energizing the winding thereof; and completes, at the contacts 561, a connection, including the condenser 573 and the contacts 551 and 421, between the interrupter generator conductor 576 and the —conductor 315; whereby ring back tone current is returned via the contacts 572 over the —conductor of the outgoing trunk 620 and consequently via the outgoing selector 605, the trunk 604, the selector 602, the finder 601 and the subscriber line 610 to the calling subscriber substation T in order to indicate to the subscriber thereat that the operator at the switchboard 100 in the manual exchange 10 is being rung. Further the control relay R560 completes, at the contacts 563, a path, including the contacts 437, 532, 424 and 412, for applying direct ground potential to the +conductor 318 so as to short-circuit the impedance element 416 via a path also including the contacts 434, the +talk conductor 317, and the coil 309 of the repeater 305. This path, when completed, reduces the impedance of the loop circuit extending from the calling subscriber substation T to the line relay R460 in the trunk circuit 300.

Also the control relay R560 interrupts, at the contacts 566, the circuit for energizing the winding of the seize relay R440 in order to cause the latter relay to restore shortly thereafter, the seize relay R440 being of the slow-to-release type. Upon restoring, the seize relay R440 interrupts, at the contacts 444, the holding circuit for energizing the lower winding of the ring out relay R450 in order to cause the latter relay to restore. During the short time interval that the seize relay R440 occupies its operated position, a connection is completed, at the contacts 442 and 443, via the resistors 428 and 545 and the contacts 543 for ringing from the direct curren generator conductor over the dial conductor 401. Thus a splash of ringing current is conducted over the dial conductor 401 completing a circuit, including the contacts 366, 393 and 326 and the condenser 329, for energizing the winding of the ring relay R330 so as to cause the latter relay to operate and then restore. Upon operating, the ring relay R330 completes, at the contacts 331, a circuit, including the contacts 342 and the resistor 338, for operating the control relay R310; and completes, at the contacts 332, a circuit for energizing the upper winding of the signal out relay R320 in order to cause the latter relay to operate shortly thereafter, the signal out relay R320 being rendered slightly slow-to-operate by virtue of the normally completed path, including the contacts 323 and 328, for short-circuiting the lower winding thereof. Upon operating, the signal out relay R320 completes, at the contacts 322, a path, including the contacts 342, for applying battery potential via the resistor 338 to the signal out conductor 884 so as to effect operation of the signal out relay R860 in the carrier terminal 800. Upon operating, the signal out relay R860 completes, at the contacts 861, the detuning circuit included in the tank circuit of the carrier frequency generator 809; whereby the carrier frequency generator 809 is controlled to interrupt the production of the carrier frequency 10,300 cycles and to initiate the production of the call frequency 8345 cycles that is impressed via the modulator 808, the modulator filter 806, and the high-pass line filter 805 upon the line 701. The call frequency 8345 cycles impressed upon the line 701 is conducted via the high-pass line filter 705 and the demodulator filter 707 to the demodulator 710 in the carrier terminal 700; whereby the call frequency 8345 cycles is beat with the carrier frequency 10,300 cycles supplied by the carrier frequency generator 711 so that the demodulator 710 produces the signal frequency 1955 cycles that is supplied via the amplifier 712, the coupling transformer 713 and the filter 715 tuned to the signal frequency 1955 cycles to the amplifier 717. The signal frequency 1955 cycles is detected in the amplifier 717 effecting operation of the signal in relay R730; whereby ground potential is applied, at the contacts 731, to the signal in conductor 783 completing a circuit, including the contacts 291, 271 and 261, for operating the signal in relay R250 in the trunk circuit 200.

Upon operating, the signal in relay R250 completes, at the contacts 251, a circuit, including the contacts 242 and 211, for energizing the winding of the ring relay R230 so as to cause the latter relay to operate shortly thereafter, it being of the slow-to-operate type. Upon operating, the ring relay R230 completes, at the contacts 231, a circuit, including the contacts 251, for operating the hold relay R240. Upon operating, the hold relay R240 completes, at the contacts 241, a holding circuit, including the contact 251, for energizing the winding thereof; and interrupts, at the contacts 242, the circuit for retaining operated the ring relay R230. Accordingly, the ring relay R230 is operated for a short time interval and then restores, completing and then interrupting, at the contacts 232, a path, including the resistor 216, for projecting ringing current from the associated ringing generator over the associated call conductor; whereby there is completed and then interrupted, a circuit, including the contacts 179 and the condenser 183, for energizing the winding of the ring-down relay R160 so as to cause the latter relay to operate and then restore.

Reverting to the trunk circuit 300, also upon operating the signal out relay R320 completes, at the contacts 324, a path, including the contacts 311 and 332, for short-circuiting the upper winding of the control relay R325 during the time interval that the ring relay R330 occupies its operated position. Now, when the ring relay R330 restores, it interrupts, at the contacts 332, the original circuit for energizing the upper winding of the signal out relay R320 and the path for short-circuiting the upper winding of the control relay R325; whereby a series holding circuit, including the contacts 311 and 324, is completed for energizing the upper windings of the control relay R325 and the signal out relay R320. Also upon restoring, the ring relay R330 interrupts, at the contacts 331, the circuit for energizing the winding of the control relay R310; however the latter relay does not restore immediately as it is of the slow-to-release type. Upon operating, the control relay R325 interrupts, at the contacts 326, a further point in the circuit for energizing the winding of the ring relay R330; and completes, at the contacts 327, a path, including the contacts 343, the resistor 337 and the contacts 393 and 366, for applying ground potential via the winding of the control relay R310 to the conductor 401. At this time, the seize relay R440 and the ring out relay R450 have restored; whereby battery potential is applied via the lower and upper windings of the supervisory relay R510, the contacts 462, the resistor 425 and the contacts 451 and 441, to the conductor 401. Accordingly, at this time, the winding of the control relay R310 is energized in series relation with the upper and lower windings of the supervisory relay R510; whereby the control relay R310 is retained in its operated position, but the supervisory relay R510 is not operated due to the inclusion of the resistor 337 and since it is of the marginal type.

Upon operating, the ring-down relay R160 completes, at the contacts 161, a circuit for energizing the winding of the signal relay R155 in order to cause the latter relay to operate shortly thereafter, it being of the slow-to-operate type. Upon operating, the signal relay R155 completes, at the contacts 158, a holding circuit, including the contacts 177, for energizing the winding thereof; completes, at the contacts 157, a circuit for illuminating the busy lamp L153; and completes, at the contacts 156, a circuit for illuminating the line lamp L152. The illumination of the busy lamp L153 associated with the jack J151 indicates to the operator at the switchboard 100 that the trunk circuit 200 is busy at this time; while the illumination of the line lamp L152 associated with the jack J151 indicates that a call is waiting to be answered upon the trunk circuit 200 at this time.

When the operator at the switchboard 100 observes the illuminated line lamp L152, she selects an idle cord circuit, such, for example, as the cord circuit 101, operates the talk key K105 thereof, and inserts the plug P102 thereof into the jack J151 terminating the trunk circuit 200. When the plug P102 is thus inserted into the jack J151, the contacts 151′ thereof are actuated into engagement effecting operation of the jack relay R175 in the manner previously explained. Upon operating, the jack relay R175 completes, at the contacts 176, a multiple circuit for illuminating the busy lamp L153; and interrupts, at the contacts 177, the holding circuit for retaining operated the signal relay R155. Upon restoring, the signal relay R155 interrupts, at the contacts 156, the circuit for illuminating the line lamp L152 associated with the jack J151, in order to indicate that the call on the trunk circuit 200 has been answered at this time. Also, upon operating, the jack relay R175 completes, at the contacts 175′, the previously-traced series circuit for energizing the upper winding of the sleeve relay R165 in the trunk circuit 200 and the supervisory relay R130 in the cord circuit 101; whereby the sleeve relay R165 operates, but the supervisory relay R130 does not immediately operate as it is of the marginal type. Upon operating the sleeve relay R165 completes, at the contacts 165′, a circuit including the contacts 178, 233, 244 and 252, for energizing the winding of the supervisory relay R170 in series with the upper winding of the disconnect relay R220 so as to cause the relays mentioned to operate. Upon operating, the supervisory relay R170 completes, at the contacts 171, the circuit for operating the control relay R180. Upon operating, the control relay R180 completes, at the contacts 182, the circuit for energizing the lower winding of the sleeve relay R165 in multiple with the upper winding thereof; whereby the sleeve relay R165 is retained in its operated position and the supervisory relay R130 is operated. Upon operating, the supervisory relay R130 completes, at the contacts 131, the circuit for illuminating the supervisory lamp L111, at this time.

Upon operating, the disconnect relay R220 completes, at the contacts 221, a holding circuit for retaining operated the hold relay R240; and completes, at the contacts 223, a path, including the contacts 215, for applying battery potential via the resistor 217 to the signal out conductor 784 in order to effect operation of the signal out relay R760 in the carrier terminal 700. Upon operating, the signal out relay R760 completes, at the contacts 761, the detuning circuit included in the plate circuit of the carrier frequency generator 709; whereby the carrier frequency generator 709 is controlled to interrupt the production of the carrier frequency 6800 cycles and to initiate the production of the dial frequency 4845 cycles; whereby the dial frequency 4845 cycles is impressed via the modulator filter 706 and the high-pass line filter 705 upon the line 701 and then passes via the high-pass line filter 805 and the demodulator filter 807 to the demodulator 810. In the demodulator 810, the dial frequency 4845 cycles is beat with the carrier frequency 6800 cycles supplied by the carrier frequency generator 811; whereby the signal frequency 1955 cycles is produced and passes through the amplifier 812, the coupling transformer 813 and the filter 815 tuned to the signal frequency 1955 cycles to the amplifier 817. The signal frequency 1955 cycles is detected in the amplifier 817 effecting operation of the signal in relay R830 in the carrier terminal 800; whereby ground potential is applied to the signal in conductor 883 completing a circuit, including the contacts 323′, for operating the supervisory relay R350. Upon operating, the supervisory relay R350 completes, at the contacts 355, a holding circuit, including the grounded signal in conductor 883, for energizing the winding thereof; and completes, at the contacts 354, a circuit, including the contacts 322′, for energizing the lower winding of the control relay R340 in order to cause the latter relay to operate. Upon operating, the control relay R340 completes, at the contacts 347, a holding circuit, including the contacts 321′, for energizing the upper winding thereof; completes, at the contacts 345, a holding circuit for energizing the lower winding of the control relay R325; interrupts, at the contacts 343, the series circuit for energizing the winding of the control relay R310 and the upper and lower windings of the supervisory relay R510; and completes, at the contacts 344, a substantially identical circuit for energizing the winding of the disconnect relay R335 in series with the upper and lower windings of the supervisory relay R510. When the last-mentioned series circuit is completed the disconnect relay R335 is not operated as it is of the marginal type; whereas the supervisory relay R510 is operated notwithstanding the circumstance that it is of the marginal type by virtue of the exclusion of the resistor 337. Further the control relay R340 completes, at the contacts 346, a multiple holding circuit, including the contacts 336, for energizing the upper windings of the control relay R325 and the signal out relay R320; and completes, at the contacts 348, a multiple around the contacts 355 in the circuit for retaining operated the supervisory relay R350. Shortly following the deenergization of the winding of the control relay R310 the latter relay restores as it is of the slow-to-release type.

Also upon operating, the disconnect relay R220 completes, at the contacts 222, a circuit, including the contacts 243, for energizing the winding of the timer relay R210 so as to cause the latter relay to operate shortly thereafter, it being of the slow-to-operate type. Upon operating, the timer relay R210 completes, at the contacts 212, a holding circuit, including the contacts 243, for energizing the winding thereof; and interrupts, at the contacts 215, the path for applying battery potential via the resistor 217 to the signal out conductor 784 so as to bring about the restoration of the signal out relay R760 in the carrier terminal 700; whereby the carrier frequency generator 709 is controlled to interrupt the production of the dial frequency 4845 cycles and to initiate the production of the carrier frequency 6800 cycles. Accordingly, the signal in relay R830 in the carrier terminal 800 restores in the manner previously explained, interrupting, at the contacts 831, the path for applying ground potential to the signal in conductor 883 so as to bring about the restoration of the supervisory relay R350 in the trunk circuit 300. Upon restoring, the supervisory relay R350 interrupts, at the contacts 354, the circuit for energizing the lower winding of the control relay R340; and completes, at the contacts 353, a multiple holding circuit, including the contacts 347, for energizing the upper winding of the control relay R340. Further, the supervisory relay R350 interrupts, at the contacts 352, the previously traced path for applying battery potential via the resistor 338 to the signal out conductor 884, so as to bring about the restoration of the signal out relay R860 in the carrier terminal 800; whereby the carrier frequency generator 809 is controlled to arrest the production of the call frequency 8345 cycles and to initiate the production of the carrier frequency 10,300 cycles.

Accordingly, the signal in relay R730 in the carrier terminal 700 restores in the manner previously explained, interrupting, at the contacts 731, the path for applying ground potential to the signal in conductor 783 so as to bring about the restoration of the signal in relay R250 in the trunk circuit 200. Upon restoring, the signal in relay R250 interrupts, at the contacts 252, the circuit for energizing the upper winding of the disconnect relay R220 in series with the winding of the supervisory relay R170; and completes, at the contacts 253, a substantially identical alternative circuit for energizing the upper and lower windings of the disconnect relay R220 in series with the winding of the supervisory relay R170. Accordingly, at this time, the disconnect relay R220 is retained in its operated position, but the supervisory relay R170 is restored since it is of the marginal type. Upon restoring, the supervisory relay R170 effects the restoration of the control relay R180; and the latter relay interrupts, at the contacts 181, the termination circuit across the line conductors 781 and 782. Also, upon restoring, the control relay R180 interrupts, at the contacts 182, the circuit for energizing the lower winding of the sleeve relay R165 in multiple with the upper winding thereof, whereby at this time the upper winding of the sleeve relay R165 is energized in series with the winding of the supervisory relay R130 so that the sleeve relay R165 is retained in its operated position and the supervisory relay R130 restores. Upon restoring, the supervisory relay R130 interrupts, at the contacts 131, the circuit for illuminating the supervisory lamp L111 so as to indicate that the connection is completed at this time between the calling subscriber substation T in the automatic exchange 20 and the operator switchboard 100 in the manual exchange 10.

Reverting to the trunk circuit 300, upon operating the supervisory relay R510, completes, at the contacts 514, a circuit for operating the busy relay R550; and completes, at the contacts 511, a circuit, including the contacts 562, for operating the reverse battery relay R570. Upon operating, the busy relay R550 interrupts, at the contacts 551, the previously traced connection between the interrupter generator conductor 576 and the —conductor 315 in order to interrupt the return of ring back tone current over the previously traced connection to the calling subscriber substation T, so as to indicate to the subscriber thereat that the call has been answered by the operator at the switchboard 100. Also upon operating, the busy relay R550 completes, at the contacts 555, a circuit, including the contacts 567 and 535, for operating the timer relay R410. Upon operating, the reverse battery relay R570 reverses, at the contacts 571, 572, 573 and 574, the polarity of the loop circuit extending via the outgoing trunk 620 between the trunk circuit 300 and the calling subscriber substation T; which reversal of polarity over the line conductors of the subscriber line 610 may be employed in the line circuit 611 for metering purposes in a conventional manner.

Upon operating, the timer relay R140 interrupts, at the contacts 411, a normally completed path for short circuiting the upper winding of the tone relay R520; whereby the upper winding of the tone relay R520 is effectively inserted in series relation with the condenser 415 between the —talk conductor 316 and the +talk conductor 317. Also the timer relay R410 interrupts, at the contacts 412, the previously-traced path for short-circuiting the impedance element 416; whereby the loop circuit extending into the trunk circuit 300 now extends directly from battery potential via the winding of the line relay R460, the contacts 432, the —talk conductor 316, the coil 308, the —conductor 315 and the contacts 573 to one line conductor of the outgoing trunk 620, and from ground potential via the impedance element 416, the contacts 434, the +talk conductor 317, the coil 309, the +conductor 318 and the contacts 571 to the other line conductor of the outgoing trunk 620.

Further, the timer relay R410 sets its armature 413 into vibration; whereby the contacts 414 are closed intermittently. After a predetermined time-interval, the armature 413 settles down steadily closing the contacts 414; whereby the winding of the timer relay R530 is steadily energized causing the latter relay to operate, it being of the slow-to-operate type. Upon operating, the timer relay R530 completes, at the contacts 534, a holding circuit, including the contacts 567 and 555, for energizing the winding thereof; completes, at the contacts 533, a local holding circuit, including the contacts 542, for energizing the winding of the hold relay R540; and interrupts, at the contacts 532, a further point in the previously-traced path for applying direct ground potential to the +conductor 318. Also the timer relay R530 interrupts, at the contacts 535, the circuit for retaining operated the timer relay R410; and completes, at the contacts 531, a direct path for short-circuiting the upper winding of the tone relay R520. Upon restoring, the timer relay R410 recompletes, at the contacts 411, the previously-traced original path for short-circuiting the upper winding of the tone relay R520.

During the short-time interval that the timer relay R410 occupied its operated position, the upper winding of the tone relay 520 was coupled by the condenser 415 in series relation with the coils 308 and 309 of the repeater 305; and class tone current from the class tone conductor 613 transversed the circuit, including the set of switch springs S614 in the finder 601, the condenser 615, the set of switch springs S616 in the selector 602, the control conductor of the trunk 604, the outgoing selector 605, the control conductor 621 of the outgoing trunk 620, the contacts 541 and the lower winding of the tone relay R520. Accordingly, during the time interval noted, the lower winding of the tone relay R520 was effectively energized causing the latter relay to operate and completes, at the contacts 521, a path for applying ground potential to the tone start conductor 522 so as to insure operation of the tone generating apparatus associated with the class tone conductor 613, etc., at this time. Also the tone current transversing the lower winding of the tone relay R520 causes a corresponding tone voltage to be induced in the upper winding thereof and to be coupled to the coils 308 and 309 of the repeater 305; whereby a corresponding tone voltage is generated in the coils 306 and 307 of the repeater 305 and coupled, via the condensers 303 and 304 and the line conductors 881 and 882 to the hybrid coil 819 in the carrier terminal 800. This class of tone signal applied to the hybrid coil 819 caused the carrier frequency 10,300 cycles supplied by the carrier frequency generator 809 to the modulator 808 to be modulated in the modulator 808 in accordance therewith; whereby the carrier frequency 10,300 cycles applied to the line 701 is modulated by the class tone signal noted. In the carrier terminal 700, the demodulator 710 operates to demodulate the carrier frequency 10,300 cycles modulated by the class tone signal; whereby the resulting class tone signal is supplied via the demodulator output filter 718 to the hybrid coil 719, and is hence coupled via the line conductor 781 and 782, the contacts 166 and 168, the tip and ring of the jack J151, the tip and ring of the plug P102, the cord circuit 101, and the contacts of the operated talk key K105 to the operator headset 113 at the switchboard 100. Accordingly the operator at the switchboard 100 receives the class tone signal indicative of the class of the calling subscriber substation T in the automatic exchange 20. This class of tone signal is returned from the trunk circuit 300 over the line 701 and the trunk circuit 200 to the operator switchboard 100 only during the short-time interval that the timer relay R410 in the trunk circuit 300 occupies its operated position and prior to operation of the timer relay R530.

In passing, it is noted that in the event the operator at the switchboard 100 fails to recognize the class tone signal, she may cause the same to be re-transmitted by the trunk circuit 300 by momentarily withdrawing and reinserting the plug P102 of the cord circuit 101 with respect to the jack J151 terminating the trunk circuit 200. When the plug P102 of the cord circuit 101 is thus withdrawn from the jack J151, the trunk circuit 200, the trunk circuit 300 and carrier terminals 700 and 800 are returned to a calling condition substantially identical to that which they occupied prior to the answering of the present call, as described above; and when the plug P102 of the cord circuit 101 is then reinserted into the jack J151, the trunk circuit 200, the trunk circuit 300 and the carrier terminals 700 and 800 are returned to the answered condition, described above. The details of these transitory operations of the trunk circuit 200, the trunk circuit 300 and the carrier terminals 700 and 800, incident to a recheck of the class tone by the operator at the switchboard 100, are not described in detail in the interest of brevity.

At this time, the operator at the switchboard 100 communicates with the subscriber at the calling subscriber substation T and learns the destination of the call; whereupon she inserts the plug P103 of the cord circuit 101 into the jack terminating the subscriber line extending to the called subscriber substation and then operates the ring key K106 in the cord circuit 101 causing ringing current to be projected from the interrupter generator 107 over the line conductors of the subscriber line to the called subscriber substation. When the subscriber at the called subscriber substation in the manual exchange 10 answers the call by removing the receiver of the telephone instrument thereat from its associated switchhook, a circuit is completed for energizing in series the windings of the supervisory relay R140, assuming that the ring key K106 occupies its restored position at this time, the ring key K106 being operated intermittently to effect the ringing noted. When the windings of the supervisory relay R140 are thus energized, the latter relay operates to interrupt, at the contacts 141, a previously completed circuit for illuminating the supervisory lamp L112, thereby rendering to the operator at the switchboard 100 answer supervision. The operator, at the switchboard 100 then restores the talk key K105; whereby there is completed at this time a private connection between the calling subscriber substation T in the automatic exchange 20 and the called subscriber substation in the manual exchange 10.

At this time, audio frequency signals received from the calling subscriber substation T in the automatic exchange 20 pass over the subscriber line 610, the finder 601, the selector 602, the trunk 604, the outgoing selector 605, the line conductors of the trunk 620, and the coils 308 and 309 of the repeater 305 in the trunk circuit 300. Corresponding audio frequency signals are induced in the coils 306 and 307 of the repeater 305 and pass via the condensers 303 and 304 and the line conductors 881 and 882 to the hybrid coil 819 in the carrier terminal 800 and thence to the modulator 808. The carrier frequency 10,300 cycles is modulated by the audio frequency signal and the resulting carrier frequency 10,300 cycles modulated by the audio frequency signals is impressed upon the line 701 and ultimately passes to the demodulator 710 in the carrier terminal 700; the carrier signal noted is demodulated in the demodulator 710 and the resulting audio frequency signals are passed via the demodulator output filter 718 to the hybrid coil 719. The audio frequency signals pass from the hybrid coil 719 via the line conductors 781 and 782 and the contacts 166 and 168 to the tip and ring of the jack J151 and thence via the cord circuit 101 to the called subscriber substation in the manual exchange 10.

Also at this time audio frequency signals received from the called subscriber substation in the manual exchange 10 pass through the cord circuit 101 and thence over the tip and ring of the jack 151 and the line conductors 781 and 782 to the hybrid coil 719 in the carrier terminal 700. The audio frequency signals then pass into the modulator 708 effecting corresponding modulation of the carrier frequency 6800 cycles that is impressed at this time upon the line 701. The carrier frequency 6800 cycles modulated by the audio frequency signals then passes over the line 701 and ultimately into the demodulator 810 in the carrier terminal 800, wherein the carrier frequency noted is demodulated and the resulting audio frequency signals are passed via the demodulator output filter 818 to the hybrid coil 819. The audio frequency signals from the hybrid coil 819 then traverses the conductors 881 and 882 to the condensers 303 and 304 and the coils 306 and 307 of the repeater 305 in the trunk circuit 300. Corresponding audio frequency signals are induced in the coils 308 and 309 of the repeater 305 and are impressed upon the line conductors of the trunk 620 and thence pass over the outgoing selector 605, the trunk 604, the selector 602, the finder 601, and the subscriber line 610 to the calling subscriber substation T in the automatic exchange 20.

At the conclusion of the connection, when the subscriber at the called subscriber substation in the manual exchange 10 replaces the receiver of the telephone instrument thereat upon its associated switchhook, the previously mentioned circuit for maintaining operated the supervisory relay R140 in the cord circuit 101 is interrupted; whereupon the latter relay restores in order to complete, at the contacts 141, the circuit for illuminating the supervisory lamp L112, associated with the plug P103. When the supervisory lamp L112 is thus illuminated, it renders to the operator switchboard 100 disconnect supervision; whereupon the operator at the switchboard 100 withdraws the plug P103 of the cord circuit 101 from the associated jack, taking down the connection to the called subscriber substation in the manual exchange 10.

Now assuming that the subscriber at the calling subscriber substation T in the automatic exchange 20 replaces the receiver of the telephone instrument thereat, upon its associated switchhook before the operator at the switchboard 100 withdraws the plug P102 of the cord circuit 101 from the associated jack J151 terminating the trunk circuit 200, the loop circuit extending between the calling subscriber substation T and the line relay R460 in the trunk circuit 300 is interrupted causing the latter relay to restore. Upon restoring, the line relay R460 interrupts, at the contacts 462, the previously traced path for applying battery potential by way of the lower and upper windings of the supervisory relay R510 to the dial conductor 401; and completes, at the contacts 463, an alternative path, including the contacts 472, the resistor 425 and the contacts 451 and 441, for applying battery potential by way of the lower winding of the supervisory relay R510 to the dial conductor 401. Accordingly, at this time, the winding of the disconnect relay R335 is energized only in series with the lower winding of the supervisory relay R510, whereby the supervisory relay R510 is retained in its operated position and the disconnect relay R335 is operated, the latter relay being of the marginal type. Upon operating, the disconnect relay R335 interrupts, at the contacts 336, the holding circuit for energizing in series the upper windings of the control relay R325 and the signal out relay R320; whereby the signal out relay R320 restores, the control relay R325 being retained in its operated position by virtue of the completed holding circuit for energizing the lower winding thereof. Upon restoring, the signal out relay R320 completes, at the contacts 321, an alternative path, including the contacts 341 and 351, for applying battery potential via the resistor 338 to the signal out conductor 884 so as to bring about reoperation of the signal out relay R860 in the carrier terminal 800 so that the carrier frequency generator 809 is controlled to arrest the production of the carrier frequency 10,300 cycles and to initiate the production of the call frequency 8345 cycles so as to bring about the operation of the signal in relay R730 in the carrier terminal 700. Upon operating, the signal in relay R730 completes, at the contacts 731, the path for applying ground potential to the signal in conductor 783 so as to complete the circuit, including the contacts 291, 271 and 261, for operating the signal in relay R250 in the trunk circuit 200. Upon operating, the signal in relay R250 completes, at the contacts 252, the circuit, including the contacts 244, 233, 178 and 165', for energizing the upper winding of the disconnect relay R220 in series with the winding of the supervisory relay R170; and interrupts, at the contacts 253, the substantially identical circuit for energizing the upper and lower windings of the disconnect relay R220 in series with the winding of the supervisory relay R170. Accordingly, at this time the disconnect relay R220 is retained in its operated position, but the supervisory relay R170 operates as it is of the marginal type. Upon operating, the supervisory relay R170 effects the operation of the control relay R180; whereby the latter relay completes, at the contacts 181, the termination circuit across the line conductors 781 and 782. Also the control relay R180 completes, at the contacts 182, the circuit for energizing the lower winding of the sleeve relay R165 in multiple with the upper winding thereof; whereby the sleeve relay R165 is retained in its operated position and the supervisory relay R130 is operated. Upon operating, the supervisory relay R130 completes, at the contacts 131, the circuit for illuminating the supervisory lamp L111 associated with the plug P102 in order to render to the operator at the switchboard 100 disconnect supervision.

Upon receiving disconnect supervision, the operator at the switchboard 100 withdraws the plug P102 of the cord circuit 101 from the associated jack J151, thereby interrupting the series circuit for maintaining operated the sleeve relay R165 in the trunk circuit 200 and the supervisory relay R130 in the cord circuit 101. The supervisory relay R130 restores to interrupt, at the contacts 131, the circuit for illuminating the supervisory lamp L111; whereby the cord circuit 101 is restored to its normal idle condition. Also when the plug P102 is withdrawn from the jack J151, the contacts 151' thereof are operated into open circuit relation interrupting the circuit for maintaining operated the jack relay R175 in the trunk circuit 200. Upon restoring the jack relay R175 interrupts, at the contacts 176, the circuit for illuminating the busy lamp L153 in order to indicate that the trunk circuit 200 has been restored to its normal idle condition. Upon restoring, the sleeve relay R165 interrupts, at the contacts 165', the series circuit for maintaining operated the supervisory relay R160 and the disconnect relay R220. Upon restoring, the supervisory relay R170 interrupts, at the contacts 171, the circuit for retaining operated the control relay R180. Upon restoring, the control relay R180 interrupts, at the contacts 181, the termination circuit across the line conductors 781 and 782. Upon restoring, the disconnect relay R220 completes, at the contacts 224, a path, including the contacts 214, for applying battery potential via the resistor 217 upon the signal out conductor 784, so as to bring about the operation of the signal out relay R760 in the carrier terminal 700. Upon operating, the signal out relay R760 controls the carrier frequency generator 709 in order to arrest production of the carrier frequency 6800 cycles and to initiate production of the dial frequency 4845 cycles; whereby the signal in relay R830 in the carrier terminal 800 is operated in the manner previously explained. Upon operating, the signal in relay R830 completes, at the contacts 831, the path for applying ground potential to the signal in conductor 883, so as to bring about operation of the supervisory relay R350 in the trunk circuit 300 over a circuit, including the contacts 348. Upon operating, the supervisory relay R350 interrupts, at the contacts 353, the holding circuit for energizing the upper winding of the control relay R340 so as to cause the latter relay to restore. Upon restoring, the control relay R340 interrupts, at the contacts 345, the holding circuit for energizing the lower winding of the control relay R325 in order to cause the latter relay to restore; and interrupts, at the contacts 344, the circuit for energizing the winding of the disconnect relay R335 in series with the lower winding of the supervisory relay R510 in order to cause the relays noted to restore.

Also upon operating, the supervisory relay R350 interrupts, at the contacts 351, the previously traced circuit for applying battery potential via the resistor 338 upon the signal out conductor 884, so as to effect the restoration of the signal out relay R860 in the carrier terminal 800. Upon restoring, the signal out relay R860 controls the carrier frequency generator 809 to arrest the production of the call frequency 8345 cycles and to initiate the production of the carrier frequency 10,300 cycles, so as to bring about the restoration of the signal in relay R730 in the carrier terminal 700. Upon restoring, the signal in relay R730 interrupts, at the contacts 731, the path for applying ground potential to the signal in conductor 783, so as to bring about the restoration of the signal in relay R250 in the trunk circuit 200. Upon restoring, the signal in relay R250 interrupts, at the contacts 251, the holding circuit for energizing the winding of the hold relay R240; whereby the latter relay restores shortly thereafter, it being of the slow-to-release type. Upon restoring, the hold relay R240 interrupts, at the contacts 243, the holding circuit for retaining operated the timer relay R210. Upon restoring, the timer relay R210 interrupts, at the contacts 214, the path for applying battery potential via the resistor 217 to the signal out conductor 784, so as to bring about the restoration of the signal out relay R760 in the carrier terminal 700. Upon restoring, the signal out relay R760 controls the carrier frequency generator 709 to arrest the production of the dial frequency 4845 cycles and to initiate the production of the carrier frequency 6800 cycles, so as to bring about the restoration of the signal in relay R830 in the carrier terminal 800. Upon restoring, the signal in relay R830 interrupts, at the contacts 831, the path for applying ground potential to the signal in conductor 883, so as to bring about the restoration of the supervisory relay R350 in the trunk circuit 300.

Upon restoring, the supervisory relay R510 interrupts, at the contacts 514, the circuit for energizing the winding of the busy relay R550 in order to cause the latter relay to restore shortly thereafter, it being of the slow-to-release type. Also the supervisory relay R510 interrupts, at the contacts 511, the circuit for retaining operated the reverse battery relay R570. Upon restoring, the busy relay R550 interrupts, at the contacts 555, the circuit for retaining operated the timer relay R530. Upon restoring, the timer relay R530 interrupts, at the contacts 533, the local holding circuit for energizing the winding of the hold relay R540 in order to cause the latter relay to restore shortly thereafter, it being of the slow-to-release type. Upon restoring, the hold relay R540 interrupts, at the contacts 544, the holding circuit for retaining operated the control relay R560. Also the hold relay R540 interrupts, at the contacts 541, the path for applying ground potential via the lower winding of the tone relay R520 to the control conductor 621 of the outgoing trunk 620; and upon restoring, the control relay R560 recompletes, at the contacts 564, the path for applying battery potential by way of the winding of the seize relay R440 to the control conductor 621 of the outgoing trunk 620. When ground potential is thus removed from the control conductor 621 of the outgoing trunk 620, the outgoing selector 605, the selector 602, and the finder 601 are released. When the selector 602 is thus released, the set of switch springs S616 is actuated into open circuit position; and when the finder 601 is thus released, the set of switch springs S615 is actuated into open circuit position. Further, when the finder 602 is thus released, ground potential is thus removed from the control conductor of the subscriber line 610 causing operation of the line circuit 611 to return battery potential upon the control conductor of the subscriber line 610 so that the subscriber line 610 extending to the subscriber substation T is again marked as idle to the connectors 607, etc., having access thereto. At this time, battery potential is applied by way of the winding of the seize relay R440 to the control conductor 621 of the outgoing trunk 620; whereby the trunk 620 is again marked as idle to the outgoing selectors 605, etc., having access thereto. At this time, the trunk circuit 200, the trunk circuit 300, the carrier terminals 700 and 800 and the automatic switching apparatus 600 are released and available for further use.

In the interest of brevity, only the first channel connected to the line 701 has been illustrated, but it will be understood that a suitable number of channels may be connected thereto in a manner identical to that disclosed to provide a stacked channel arrangement. Of course each other channel that is connected to the line 701 is provided with two carrier terminals respectively corresponding to the carrier terminal 700 and 800 and two trunk circuits respectively corresponding to the trunk circuits 200 and 300. Furthermore, the carrier frequencies employed in the several channels for supervisory purposes and for communication purposes must be so selected and disposed that there is no interference between the channels stacked upon the line 701. For example, in the second channel, the west terminal may transmit the dial frequency 18,845 cycles and the lower side band of the carrier frequency 20,800 cycles, and the east terminal may transmit the call frequency 14,845 cycles and the lower side band of the carrier frequency 16,800 cycles. Similarly, in the third channel, the west terminal may transmit the dial frequency 26,345 cycles and the lower side band of the carrier frequency 28,300 cycles, and the east terminal may transmit the call frequency 30,845 cycles and the lower side band of the carrier frequency 32,800 cycles.

In view of the foregoing, it is apparent that there has been provided in a telephone system comprising a first exchange provided with an operator switchboard and a second exchange provided with automatic switching apparatus and subscriber substations, an arrangement including an improved trunk circuit disposed between the operator switchboard and an associated carrier current terminal unit and an improved trunk circuit disposed between the automatic switching apparatus and the associated carrier current terminal unit; whereby the setting up of connections in either direction involving the operator switchboard and the subscriber substations may be controlled in a simple and straightforward manner.

While there has been described what is at present considered to be the preferred embodiment of the invention, it will be understood that various modifications may be made therein, and it is intended to cover in the appended claims all such modifications that fall within the true spirit and scope of the invention.

What is claimed is:

1. In a telephone system comprising first and second exchanges and a carrier frequency signal circuit, said first exchange including an operator switchboard and a first carrier current terminal coupled to said signal circuit, said second exchange including a plurality of subscriber substations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from said operator switchboard to said first terminal, means included in said first terminal and responsive to the completion of said last-mentioned connection for interrupting said first carrier frequency signal transmitted over said signal circuit and for transmitting a third carrier frequency signal over said signal circuit, means included in said second terminal and responsive to said third carrier frequency signal for completing a connection therefrom to said switching apparatus, means for transmitting one or more digits from said operator switchboard to said first terminal, means included in said first terminal and responsive to said one or more digits for interrupting in accordance therewith said third carrier frequency signal transmitted over said signal circuit, means included in said second terminal and responsive to said interruptions of said third carrier frequency signal for repeating a corresponding digit or digits to said switching apparatus, said switching apparatus being operative in response to said digit or digits to select a corresponding called one of said subscriber substations in order to extend a call thereto, means included in said second terminal and responsive to answering of the call at said one subscriber substation, means controlled by said last-mentioned means for interrupting said second carrier frequency signal transmitted over said signal circuit and for transmitting a fourth carrier frequency signal over said signal circuit and then after a short time interval for interrupting said fourth carrier frequency signal transmitted over said signal circuit and for retransmitting said second carrier frequency signal over said signal circuit, whereby a short pulse of said fourth carrier frequency signal is transmitted from said second terminal over said signal circuit, and means included in said first terminal and responsive to said short pulse of said fourth carrier frequency signal for interrupting said third carrier frequency signal transmitted over said signal circuit and for retransmitting said first carrier frequency signal over said signal circuit.

2. In a telephone system comprising first and second exchanges and a carrier frequency signal circuit, said first exchange including an operator switchboard and a first carrier current terminal coupled to said signal circuit, said second exchange including a plurality of subscriber substations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from said operator switchboard to said first terminal, means included in said first terminal and responsive to the completion of said last-mentioned connection for interrupting said first carrier frequency signal transmitted over said signal circuit and for transmitting a third carrier frequency signal over said signal circuit, means included in said second terminal and responsive to said third carrier frequency signal for completing a connection therefrom to said switching apparatus, means for transmitting one or more digits from said operator switchboard to said first terminal, means included in said first terminal and responsive to said one or more digits for interrupting in accordance therewith said third carrier frequency signal transmitted over said signal circuit, means included in said second terminal and responsive to said interruptions of said third carrier frequency signal for repeating a corresponding digit or digits to said switching apparatus, said switching apparatus being operative in response to said digit or digits to select a corresponding called one of said subscriber substations in order to extend a call thereto, means included in said second terminal and responsive to answering of the call at said one subscriber substation, means controlled by said last-mentioned means for interrupting said second carrier frequency signal transmitted over said signal circuit and for transmitting a fourth carrier frequency signal over said signal circuit and then after a short time interval for interrupting said fourth carrier frequency signal transmitted over said signal circuit and for retransmitting said second carrier frequency signal over said signal circuit, whereby a short pulse of said fourth carrier frequency signal is transmitted from said second terminal over said signal circuit, means included in said first terminal and responsive to said short pulse of said fourth carrier frequency signal for returning an answer signal to said operator switchboard and for interrupting said third carrier frequency signal transmitted over said signal circuit and for retransmitting said first carrier frequency signal over said signal circuit.

3. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from said first station to said first terminal, means included in said first terminal and responsive to the completion of said last-mentioned connection for interrupting said first carrier frequency signal transmitted over said signal circuit and for transmitting a third carrier frequency signal over signal circuit, means included in said second terminal and responsive to said third carrier frequency signal for completing a connection therefrom to said switching apparatus, means for transmitting one or more digits from said first station to said first terminal, means included in first terminal and responsive to said one or more digits for interrupting in accordance therewith said third carrier frequency signal transmitted over said signal circuit, means included in said second terminal and responsive to said interruptions of said third carrier frequency signal for repeating a corresponding digit or digits to said switching apparatus, said switching apparatus being operative in response to said digit or digits to select a corresponding called one of said second stations in order to extend a call thereto, means included in said second terminal and responsive to answering of the call at said one second station, means controlled by said last-mentioned means for interrupting said second carrier frequency signal transmitted over said signal circuit and for transmitting a fourth carrier frequency signal over said signal circuit and then after a short time interval for interrupting said fourth carrier frequency signal transmitted over said signal circuit and for retransmitting said second carrier frequency signal over said signal circuit, whereby a short pulse of said fourth carrier frequency signal is transmitted from said second terminal over said signal circuit, and means included in said first terminal and responsive to said short pulse of said fourth carrier frequency signal for interrupting said third carrier frequency signal transmitted over said signal circuit and for retransmitting said first carrier frequency signal over said signal circuit.

4. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from said first station to said first terminal, means included in said first terminal and responsive to the completion of said last-mentioned connection for interrupting said first carrier frequency signal transmitted over said signal circuit and for transmitting a third carrier frequency signal over said signal circuit, means included in said second terminal and responsive to said third carrier frequency signal for completing a connection therefrom to said switching apparatus, means for transmitting one or more digits from said first station to said first terminal, means included in said first terminal and responsive to said one or more digits for interrupting in accordance therewith said third carrier frequency signal transmitted over said signal circuit, means included in said second terminal and responsive to said interruptions of said third carrier frequency signal for repeating a corresponding digit or digits to said switching apparatus, said switching apparatus being operative in response to said digit or digits to select a corresponding called one of said second stations in order to extend a call thereto, said second terminal including a timer, means included in said second terminal and responsive to answering of the call at said one second station, means controlled by said last-mentioned means for interrupting said second carrier frequency signal transmitted over said signal circuit and for transmitting a fourth carrier frequency signal over said signal circuit and for initiating operation of said timer, means controlled by a short timing operation of said timer for interrupting said fourth carrier frequency signal transmitted over said signal circuit and for retransmitting said second carrier frequency signal over said signal circuit, whereby a short pulse of said fourth carrier frequency signal is transmitted from said second terminal over said signal circuit, and means included in said first terminal and responsive to said short pulse of said fourth carrier frequency signal for interrupting said third carrier frequency signal transmitted over said signal circuit and for retransmitting said first carrier frequency signal over said signal circuit.

5. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from said first station to said first terminal, means included in said first terminal and responsive to the completion of said last-mentioned connection for interrupting said first carrier frequency signal transmitted over said signal circuit and for transmitting a third carrier frequency signal over signal circuit, means included in said second terminal and responsive to said third carrier frequency signal for completing a connection therefrom to said switching apparatus, means for transmitting one or more digits from said first station to said first terminal, means included in said first terminal and responsive to said one or more digits for interrupting in accordance therewith said third carrier frequency signal transmitted over said signal circuit, means included in said second terminal and responsive to said interruptions of said third carrier frequency signal for repeating a corresponding digit or digits to said switching apparatus, said switching apparatus being operative in response to said digit or digits to select a corresponding called one of said second stations, means included in said switching apparatus and responsive to operation thereof to select said one second station for transmitting a call signal to said one second station and for initiating the return of an audible supervisory signal to said second terminal, means included in said second terminal for modulating with said supervisory signal said second carrier frequency signal transmitted over said signal circuit, means included in said first terminal for demodulating said modulated second carrier frequency signal and for returning the resulting audible supervisory signal to said first station, means included in said switching apparatus and responsive to answering of the call at said one second station, means controlled by said last-mentioned means for arresting the return of said supervisory signal to said second terminal, means included in said second terminal and responsive to answering of the call at said one second station, means controlled by said last-mentioned means for interrupting said second carrier frequency signal transmitted over said signal circuit and for transmitting a fourth carrier frequency signal over said signal circuit and then after a short time interval for interrupting said fourth carrier frequency signal transmitted over said signal circuit and for retransmitting said second carrier frequency signal over said signal circuit, whereby a short pulse of said fourth carrier frequency signal is transmitted from said second terminal over said signal circuit, and means included in said first terminal and responsive to said short pulse of said fourth carrier frequency signal for interrupting said third carrier frequency signal transmitted over said signal circuit and for retransmitting said first carrier frequency signal over said signal circuit.

6. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from said first station to said first terminal, means included in said first terminal and responsive to the completion of said last-mentioned connection for interrupting said first carrier frequency signal transmitted over said signal circuit and for transmitting a third carrier frequency signal over signal circuit, means included in said second terminal and responsive to said third carrier frequency signal for completing a connection therefrom to said switching apparatus, means for transmitting one or more digits from said first station to said first terminal, means included in said first terminal and responsive to said one or more digits for interrupting in accordance therewith said third carrier frequency signal transmitted over said signal circuit, means included in said second terminal and responsive to said interruptions of said third carrier frequency signal for repeating a corresponding digit or digits to said switching apparatus, said switching apparatus being operative in response to said digit or digits to select a corresponding called one of said second stations, means included in said switching apparatus and responsive to operation thereof to select said one second station for testing the idle or busy condition of said one second station, means included in said switching apparatus and responsive to an idle test for transmitting a call signal to said one second station and for initiating the return of an audible idle signal to said second terminal and responsive to a busy test for returning an audible busy signal to said second terminal, means included in said second terminal for modulating with said idle signal or with said busy signal, said second carrier frequency signal transmitted over said signal circuit, means included in said first terminal for demodulating said modulated second carrier frequency signal and for returning the resulting audible idle signal or audible busy signal to said first station, means included in said switching apparatus and responsive to answering of the call at said one second station, means controlled by said last-mentioned means for arresting the return of said idle signal to said second terminal, means included in said second terminal and responsive to answering of the call at said one second station, means controlled by said last-mentioned means for interrupting said second carrier frequency signal transmitted over said signal circuit and for transmitting a fourth carrier frequency signal over said signal circuit and then after a short time interval for interrupting said fourth carrier frequency signal transmitted over said signal circuit and for retransmitting said second carrier frequency signal over said signal circuit, whereby a short pulse of said fourth carrier frequency signal is transmitted from said second terminal over said signal circuit, and means included in said first terminal and responsive to said short pulse of said fourth carrier frequency signal for interrupting said third carrier frequency signal transmitted over said signal circuit and for retransmitting said first carrier frequency signal over said signal circuit.

7. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from said first station to said first terminal, means included in said first terminal and responsive to the completion of said last-mentioned connection for interrupting said first carrier frequency signal transmitted over said signal circuit and for transmitting a third carrier frequency signal over said signal circuit, means included in said second terminal and responsive to said third carrier frequency signal for beating therewith said first carrier frequency signal to produce a control signal, means included in said second terminal and responsive to said control signal for completing a connection therefrom to said switching apparatus, means for transmitting one or more digits from said first station to said first terminal, means included in said first terminal and responsive to said one or more digits for interrupting in accordance therewith said third carrier frequency signal transmitted over said signal circuit, said beating means included in said second terminal being responsive to said interruptions of said third carrier frequency signal correspondingly to interrupt said control signal, means included in said second terminal and responsive to said interruptions of said control signal for repeating a corresponding digit or digits to said switching apparatus, said switching apparatus being operative in response to said digit or digits to select a corresponding called one of said second stations in order to extend a call thereto, means included in said second terminal and responsive to answering of the call at said one second station, means controlled by said last-mentioned means for interrupting said second carrier frequency signal transmitted over said signal circuit and for transmitting a fourth carrier frequency signal over said signal circuit and then after a short time interval for interrupting said fourth carrier frequency signal transmitted over said signal circuit and for retransmitting said second carrier frequency signal over said signal circuit, whereby a short pulse of said fourth carrier frequency signal is transmitted from said second terminal over said signal circuit, means included in said first terminal and responsive to said fourth carrier frequency signal for beating therewith said second carrier frequency signal to produce said control signal, whereby a short pulse of said control signal is produced in said first terminal, and means included in said first terminal and responsive to said short pulse of said control signal for interrupting said third carrier frequency signal transmitted over said signal circuit and for retransmitting said first carrier frequency signal over said signal circuit.

8. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from said first station to said first terminal, means included in said first terminal and responsive to the completion of said last-mentioned connection for interrupting said first carrier frequency signal transmitted over said signal circuit and for transmitting a third carrier frequency signal over signal circuit, means included in said second terminal and responsive to said third carrier frequency signal for completing a connection therefrom to said switching apparatus, means for transmitting one or more digits from said first station to said first terminal, means included in said first terminal and responsive to said one or more digits for interrupting in accordance therewith said third carrier frequency signal transmitted over said signal circuit, means included in said second terminal and responsive to said interruptions of said third carrier frequency signal for repeating a corresponding digit or digits to said switching apparatus, said switching apparatus being operative in response to said digit or digits to select a corresponding called one of said second stations in order to extend a call thereto, means included in said second terminal and responsive to answering of the call at said one second station, means controlled by said last-mentioned means for interrupting said second carrier frequency signal transmitted over said signal circuit and for transmitting a fourth carrier frequency signal over said signal circuit and then after a short time interval for interrupting said fourth carrier frequency signal transmitted over said signal circuit and for retransmitting said second carrier frequency signal over said signal circuit, whereby a short pulse of said fourth carrier frequency signal is transmitted from said second terminal over said signal circuit, means included in said first terminal and responsive to said short pulse of said fourth carrier frequency signal for interrupting said third carrier frequency signal transmitted over said signal circuit and for retransmitting said first carrier frequency signal over said signal circuit, means included in said first terminal and responsive to an audio frequency signal received from said first station for modulating therewith said first carrier frequency signal transmitted over said signal circuit, means included in said second terminal for demodulating said modulated first carrier frequency signal and for transmitting the resulting audio frequency signal over said switching apparatus to said one second station, means included in said second terminal and responsive to an audio frequency signal received over said switching apparatus from said one second station for modulating therewith said second carrier frequency signal transmitted over said signal circuit, and means included in first terminal for demodulating said modulated second carrier frequency signal and for transmitting the resulting audio frequency signal to said first station.

9. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means for setting up a connection from said first station via said first terminal and said signal circuit and said second terminal and said switching apparatus to any one of said second stations, means included in said first terminal for normally transmitting a first carrier frequency signal over said signal circuit, means included in said second terminal for normally transmitting a second carrier frequency signal over said signal circuit, means included in said first terminal and responsive to an audio frequency signal received from said first station for modulating therewith said first carrier frequency signal transmitted over said signal circuit, means included in said second terminal for demodulating said modulated first carrier frequency signal and for transmitting the resulting audio frequency signal over said switching apparatus to said one second station, means included in said second terminal and responsive to an audio frequency signal received over said switching apparatus from said one second station for modulating therewith said second carrier frequency signal transmitted over said signal circuit, means included in said first terminal for demodulating said modulated second carrier frequency signal and for transmitting the resulting audio frequency signal to said first station, means included in said second terminal and responsive to disconnecting at said one second station, means controlled by said last-mentioned means for interrupting said second carrier frequency signal transmitted over said signal circuit and for transmitting a third carrier frequency signal over said signal circuit, means included in said first terminal and responsive to said third carrier frequency signal for returning a disconnect signal to said first station and for interrupting said first carrier frequency signal transmitted over said signal circuit and for transmitting a fourth carrier frequency signal over said signal circuit, means included in said first terminal and responsive to disconnecting at said first station, means controlled by said last-mentioned means for interrupting said fourth carrier frequency signal transmitted over said signal circuit and for retransmitting said first carrier frequency signal over said signal circuit, and means included in said second terminal and responsive to the interruption of said fourth carrier frequency signal for releasing said switching apparatus and for interrupting said third carrier frequency signal transmitted over said signal circuit and for retransmitting said second carrier frequency signal over said signal circuit.

10. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from said first station to said first terminal, means included in said first terminal and responsive to the completion of said last-mentioned connection for interrupting said first carrier frequency signal transmitted over said signal circuit and for transmitting a third carrier frequency signal over signal circuit, means included in said second terminal and responsive to said third carrier frequency signal for completing a connection therefrom to said switching apparatus, means for transmitting one or more digits from said first station to said first terminal, means included in said first terminal and responsive to said one or more digits for interrupting in accordance therewith said third carrier frequency signal transmitted over said signal circuit, means included in said second terminal and responsive to said interruptions of said third carrier frequency signal for repeating a corresponding digit or digits to said switching apparatus, said switching apparatus being operative in response to said digit or digits to select a corresponding called one of said second stations in order to extend a call thereto, means included in said second terminal and responsive to answering of the call at said one second station, means controlled by said last-mentioned means for interrupting said second carrier frequency signal transmitted over said signal circuit and for transmitting a fourth carrier frequency signal over said signal circuit and then after a short time interval for interrupting said fourth carrier frequency signal transmitted over said signal circuit and for retransmitting said second carrier frequency signal over said signal circuit, whereby a short pulse of said fourth carrier frequency signal is transmitted from said second terminal over said signal circuit, means included in said first terminal and responsive to said short pulse of said fourth carrier frequency signal for interrupting said third carrier frequency signal transmitted over said signal circuit and for retransmitting said first carrier frequency signal over said signal circuit, means included in said first terminal and responsive to an audio frequency signal received from said first station for modulating therewith said first carrier frequency signal transmitted over said signal circuit, means included in said second terminal for demodulating said modulated first carrier frequency signal and for transmitting the resulting audio frequency signal over said switching apparatus to said one second station, means included in said second terminal and responsive to an audio frequency signal received over said switching apparatus from said one second station for modulating therewith said second carrier frequency signal transmitted over said signal circuit, means included in said first terminal for demodulating said modulated second carrier frequency signal and for transmitting the resulting audio frequency signal to said first station, means included in said second terminal and responsive to disconnecting at said one second station, means controlled by said last-mentioned means for interrupting said second carrier frequency signal transmitted over said signal circuit and for retransmitting said fourth carrier frequency signal over said signal circuit, means included in said first terminal and responsive to said fourth carrier frequency signal for returning a disconnect signal to said first station and for interrupting said first carrier frequency signal transmitted over said signal circuit and for retransmitting said third carrier frequency signal over said signal circuit, means included in said first terminal and responsive to disconnecting at said first station, means controlled by said last-mentioned means for interrupting said third carrier frequency signal transmitted over said signal circuit and for retransmitting said first carrier frequency signal over said signal circuit, and means included in said second terminal and responsive to the interruption of said third carrier frequency signal for releasing said switching apparatus and for interrupting said fourth carrier frequency signal transmitted over said signal circuit and for retransmitting said second carrier frequency signal over said signal circuit.

11. In a telephone system comprising first and second exchanges and a carrier frequency signal circuit, said first exchange including an operator switchboard and a first carrier current terminal coupled to said signal circuit, said second exchange including a plurality of subscriber substations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from any calling one of said subscriber substations to said switching apparatus and then for transmitting one or more digits thereto in order to operate said switching apparatus to complete a connection therefrom to said second terminal, means included in said second terminal and responsive to the completion of said last-mentioned connection for interrupting said second carrier frequency signal transmitted over said signal circuit and for transmitting a third carrier frequency signal over said signal circuit, means included in said first terminal and responsive to said third carrier frequency signal for transmitting a call signal to said operator switchboard, means included in said first terminal and responsive to answering at said operator switchboard, means controlled by said last-mentioned means for interrupting said first carrier frequency signal transmitted over said signal circuit and for transmitting a fourth carrier frequency signal over said signal circuit and then after a short time interval for interrupting said fourth carrier frequency signal transmitted over said signal circuit and for retransmitting said first carrier frequency signal over said signal circuit, whereby a short pulse of said fourth carrier frequency signal is transmitted from said first terminal over said signal circuit, means included in said second terminal and responsive to said short pulse of said fourth carrier frequency signal for interrupting said third carrier frequency signal transmitted over said signal circuit and for retransmitting said second carrier frequency signal over said signal circuit and for modulating during a short time interval with an audible class signal said second carrier frequency signal transmitted over said signal circuit, and means included in said first terminal for demodulating said modulated second carrier frequency signal and for transmitting the resulting audible class signal to said operator switchboard.

12. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from any calling one of said second stations to said switching apparatus and then for transmitting one or more digits thereto in order to operate said switching apparatus to complete a connection therefrom to said second terminal, means included in said second terminal and responsive to the completion of said last-mentioned connection for interrupting said second carrier frequency signal transmitted over said signal circuit and for transmitting a third carrier frequency signal over said signal circuit, means included in said first terminal and responsive to said third carrier frequency signal for transmitting a call signal to said first station, means included in said first terminal and responsive to answering at said first station, means controlled by said last-mentioned means for interrupting said first carrier frequency signal transmitted over said signal circuit and for transmitting a fourth carrier frequency signal over signal circuit and then after a short time interval for interrupting said fourth carrier frequency signal transmitted over said signal circuit and for retransmitting said first carrier frequency signal over said signal circuit, whereby a short pulse of said fourth carrier frequency signal is transmitted from said first terminal over said signal circuit, and means included in said second terminal and responsive to said short pulse of said fourth carrier frequency signal for interrupting said third carrier frequency signal transmitted over said signal circuit and for retransmitting said second carrier frequency signal over said signal circuit.

13. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from any calling one of said second stations to said switching apparatus and then for transmitting one or more digits thereto in order to operate said switching apparatus to complete a connection therefrom to said second terminal, means included in said second terminal and responsive to the completion of said last-mentioned connection for interrupting said second carrier frequency signal transmitted over said signal circuit and for transmitting a third carrier frequency signal over said signal circuit, means included in said first terminal and responsive to said third carrier frequency signal for transmitting a call signal to said first station, said first terminal including a timer, means included in said first terminal and responsive to answering at said first station, means controlled by said last-mentioned means for interrupting said first carrier frequency signal transmitted over said signal circuit and for transmitting a fourth carrier frequency signal over said signal circuit and for initiating operation of said timer, means controlled by a short timing operation of said timer for interrupting said fourth carrier frequency signal transmitted over said signal circuit and for retransmitting said first carrier frequency signal over said signal circuit, whereby a short pulse of said fourth carrier frequency signal is transmitted from said first terminal over said signal circuit and means included in said second terminal and responsive to said short pulse of said fourth carrier frequency signal for interrupting said third carrier frequency signal transmitted over said signal circuit and for retransmitting said second carrier frequency signal over said signal circuit.

14. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from any calling one of said second stations to said switching apparatus and then for transmitting one or more digits thereto in order to operate said switching apparatus to complete a connection therefrom to said second terminal, means included in said second terminal and responsive to the completion of said last-mentioned connection for interrupting said second carrier frequency signal transmitted over said signal circuit and for transmitting a third carrier frequency signal over said signal circuit, means included in said first terminal and responsive to said third carrier frequency signal for beating therewith said second carrier frequency signal to produce a control signal, means included in said first terminal and responsive to said control signal for transmitting a call signal to said first station, means included in said first terminal and responsive to answering at said first station, means controlled by said last-mentioned means for interrupting said first carrier frequency signal transmitted over said signal circuit and for transmitting a fourth carrier frequency signal over said signal circuit and then after a short time interval for interrupting said fourth carrier frequency signal transmitted over said signal circuit and for retransmitting said first carrier frequency signal over said signal circuit, whereby a short pulse of said fourth carrier frequency signal is transmitted from said first terminal over said signal circuit, means included in said second terminal and responsive to said fourth carrier frequency signal for beating therewith said first carrier frequency signal to produce said control signal, whereby a short pulse of said control signal is produced in said second terminal, and means included in said second terminal and responsive to said short pulse of said control signal for interrupting said third carrier frequency signal transmitted over said signal circuit and for retransmitting said second carrier frequency signal over said signal circuit.

15. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from any calling one of said second stations to said switching apparatus and then for transmitting one or more digits thereto in order to operate said switching apparatus to complete a connection therefrom to said second terminal, means included in said second terminal and responsive to the completion of said last-mentioned connection for interrupting said second carrier frequency signal transmitted over said signal circuit and for transmitting a third carrier frequency signal over said signal circuit, means included in said first terminal and responsive to said third carrier frequency signal for transmitting a call signal to said first station, means included in said first terminal and responsive to answering at said first station, means controlled by said last-mentioned means for interrupting said first carrier frequency signal transmitted over said signal circuit and for transmitting a fourth carrier frequency signal over signal circuit and then after a short time interval for interrupting said fourth carrier frequency signal transmitted over said signal circuit and for retransmitting said first carrier frequency signal over said signal circuit, whereby a short pulse of said fourth carrier frequency signal is transmitted from said first terminal over said signal circuit, means included in said second terminal and responsive to said short pulse of said fourth carrier frequency signal for interrupting said third carrier frequency signal transmitted over said signal circuit and for retransmitting said second carrier frequency signal over said signal circuit, means included in said first terminal and responsive to an audio frequency signal received from said first station for modulating therewith said first carrier frequency signal transmitted over said signal circuit, means included in said second terminal for demodulating said modulated first carrier frequency signal over said switching apparatus to said one second station, means included in said second terminal and responsive to an audio frequency signal received over said switching apparatus from said one second station for modulating therewith said second carrier frequency signal transmitted over said signal circuit, and means included in said first terminal for demodulating said modulated second carrier frequency signal and for transmitting the resulting audio frequency signal to said first station.

16. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means for setting up a connection from any calling one of said second stations via said switching apparatus and said second terminal and said signal circuit and said first terminal to said first station, means included in said first terminal for normally transmitting a first carrier frequency signal over said signal circuit, means included in said second terminal for normally transmitting a second carrier frequency signal over said signal circuit, means included in said first terminal and responsive to an audio frequency signal received from said first station for modulating therewith said first carrier frequency signal transmitted over said signal circuit, means included in said second terminal for demodulating said modulated first carrier frequency signal and for transmitting the resulting audio frequency signal over said switching apparatus to said one second station, means included in said second terminal and responsive to an audio frequency signal received over said switching apparatus from said one second station for modulating therewith said second carrier frequency signal transmitted over said signal circuit, means included in said first terminal for demodulating said modulated second carrier frequency signal and for transmitting the resulting audio frequency signal to said first station, means included in said second terminal and responsive to disconnecting at said one second station, means controlled by said last-mentioned means for interrupting said second carrier frequency signal transmitted over said signal circuit and for transmitting a third carrier frequency signal over said signal circuit, means including in said first terminal and responsive to said third carrier frequency signal for transmitting a disconnect signal to said first station, means included in said first terminal and responsive to disconnecting at said first station, means controlled by said last-mentioned means for interrupting said first carrier frequency signal transmitted over said signal circuit and for transmitting a fourth carrier frequency signal over said signal circuit, means included in said second terminal and responsive to said fourth carrier frequency signal for releasing said switching apparatus and for interrupting said third carrier frequency signal transmitted over said signal circuit and for retransmitting said second carrier frequency signal over said signal circuit, and means included in said first terminal and responsive to the interruption of said third carrier frequency signal for interrupting said fourth carrier frequency signal transmitted over said signal circuit and for retransmitting said first carrier frequency signal over said signal circuit.

17. In a telephone system comprising first and second exchanges and a carrier frequency signal circuit, said first exchange including a first telephone station and a first carrier current terminal coupled to said signal circuit, said second exchange including a plurality of second telephone stations and automatic switching apparatus and a second carrier current terminal coupled to said signal circuit, means included in said first terminal for normally transmitting a first carrier frequency signal over said signal circuit, means included in said second terminal for normally transmitting a second carrier frequency signal over said signal circuit, means for completing a connection from any calling one of said second stations to said switching apparatus and then for transmitting one or more digits thereto in order to operate said switching apparatus to complete a connection therefrom to said second terminal, means included in said second terminal and responsive to the completion of said last-mentioned connection for interrupting said second carrier frequency signal transmitted over said signal circuit and for transmitting a third carrier frequency signal over said signal circuit, means included in said first terminal and responsive to said third carrier frequency signal for transmitting a call signal to said first station, means included in said first terminal and responsive to answering at said first station, means controlled by said last-mentioned means for interrupting said first carrier frequency signal transmitted over said signal circuit and for transmitting a fourth carrier frequency signal over signal circuit and then after a short time interval for interrupting said fourth carrier frequency signal transmitted over said signal circuit and for retransmitting said first carrier frequency signal over said signal circuit, whereby a short pulse of said fourth carrier frequency signal is transmitted from said first terminal over said signal circuit, means included in said second terminal and responsive to said short pulse of said fourth carrier frequency signal for interrupting said third carrier frequency signal transmitted over said signal circuit and for retransmitting said second carrier frequency signal over said signal circuit, means included in said second terminal and responsive to disconnecting at said one second station, means controlled by said last-mentioned means for interrupting said second carrier frequency signal transmitted over said signal circuit and for retransmitting said third carrier frequency signal over said signal circuit, means included in said first terminal and responsive to said third carrier frequency signal for transmitting a disconnect signal to said first station, means included in said first terminal and responsive to disconnecting at said first station, means controlled by said last-mentioned means for interrupting said first carrier frequency signal transmitted over said signal circuit and for retransmitting said fourth carrier frequency signal over said signal circuit, means included in said second terminal and responsive to said fourth carrier frequency signal for releasing said switching apparatus and for interrupting said third carrier frequency signal transmitted over said signal circuit and for retransmitting said second carrier frequency signal over said signal circuit, and means included in said first terminal and responsive to the interruption of said third carrier frequency signal for interrupting said fourth carrier frequency signal transmitted over said signal circuit and for retransmitting said first carrier frequency signal over said signal circuit.

References Cited in the file of this patent

UNITED STATES PATENTS

| | | |
|---|---|---|
| 2,414,440 | Brandt | Jan. 21, 1947 |
| 2,535,446 | Mitchell | Dec. 26, 1950 |
| 2,559,165 | Molnar | July 3, 1951 |
| 2,590,672 | Bakker | Mar. 25, 1952 |
| 2,590,746 | Adler | Mar. 25, 1952 |
| 2,691,068 | Pharis | Oct. 5, 1954 |